US009159313B2

United States Patent
Saeki et al.

(10) Patent No.: US 9,159,313 B2
(45) Date of Patent: Oct. 13, 2015

(54) PLAYBACK CONTROL APPARATUS, PLAYBACK CONTROL METHOD, AND MEDIUM FOR PLAYING A PROGRAM INCLUDING SEGMENTS GENERATED USING SPEECH SYNTHESIS AND SEGMENTS NOT GENERATED USING SPEECH SYNTHESIS

(71) Applicant: Sony Corporation, Minato-ku (JP)

(72) Inventors: Takaaki Saeki, Minato-ku (JP); Yukiyoshi Hirose, Shinagawa-ku (JP)

(73) Assignee: SONY CORPORATION, Tokyo (JP)

( * ) Notice: Subject to any disclaimer, the term of this patent is extended or adjusted under 35 U.S.C. 154(b) by 79 days.

(21) Appl. No.: 13/687,844

(22) Filed: Nov. 28, 2012

(65) Prior Publication Data

US 2013/0262118 A1    Oct. 3, 2013

Related U.S. Application Data

(60) Provisional application No. 61/619,677, filed on Apr. 3, 2012.

(51) Int. Cl.
 *G10L 13/08* (2013.01)
(52) U.S. Cl.
 CPC ..................................... *G10L 13/08* (2013.01)
(58) Field of Classification Search
 CPC ........................................................ G10L 13/08
 USPC ........................................................ 704/260
 See application file for complete search history.

(56) References Cited

U.S. PATENT DOCUMENTS

| | | | | |
|---|---|---|---|---|
| 6,810,379 | B1 * | 10/2004 | Vermeulen et al. | 704/260 |
| 7,043,432 | B2 * | 5/2006 | Bakis et al. | 704/260 |
| 7,469,208 | B1 * | 12/2008 | Kincaid | 704/224 |
| 8,831,365 | B2 * | 9/2014 | King et al. | 382/229 |
| 8,838,450 | B1 * | 9/2014 | Killalea et al. | 704/258 |
| 8,849,676 | B2 * | 9/2014 | Goldstein et al. | 704/278 |
| 8,874,504 | B2 * | 10/2014 | King et al. | 707/608 |
| 8,878,809 | B1 * | 11/2014 | Kim et al. | 345/173 |
| 8,897,486 | B1 * | 11/2014 | Killalea et al. | 382/100 |
| 8,903,723 | B2 * | 12/2014 | Kurzweil et al. | 704/235 |
| 8,953,886 | B2 * | 2/2015 | King et al. | 382/177 |
| 2003/0097265 | A1 | 5/2003 | Sakai et al. | |
| 2007/0150456 | A1 * | 6/2007 | Lian et al. | 707/3 |
| 2007/0260460 | A1 | 11/2007 | Hyatt | |
| 2007/0276667 | A1 * | 11/2007 | Atkin et al. | 704/260 |
| 2008/0155129 | A1 * | 6/2008 | Khedouri et al. | 710/8 |
| 2008/0189099 | A1 * | 8/2008 | Friedman et al. | 704/8 |

(Continued)

FOREIGN PATENT DOCUMENTS

| | | |
|---|---|---|
| JP | 2006-030384 | 2/2006 |
| JP | 2009-265279 | 11/2009 |
| JP | 2012003610 A | 1/2012 |

*Primary Examiner* — Michael N Opsasnick
(74) *Attorney, Agent, or Firm* — Hazuki International, LLC

(57) ABSTRACT

A playback control apparatus includes a playback controller configured to control playback of first content and second content. The first content is to output first sound which is generated based on text information using speech synthesis processing. The second content is to output second sound which is generated not using the speech synthesis processing. The playback controller causes an attribute of content to be played back to be displayed on the screen, the attribute indicating whether or not the content is to output sound which is generated based on text information using speech synthesis processing.

16 Claims, 24 Drawing Sheets

(56) References Cited

U.S. PATENT DOCUMENTS

| | | | |
|---|---|---|---|
| 2010/0082328 A1* | 4/2010 | Rogers et al. | 704/8 |
| 2010/0082349 A1* | 4/2010 | Bellegarda et al. | 704/260 |
| 2010/0174545 A1 | 7/2010 | Otani | |
| 2012/0023095 A1* | 1/2012 | Wadycki et al. | 707/723 |
| 2014/0258462 A1* | 9/2014 | Hwang | 709/219 |
| 2014/0277735 A1* | 9/2014 | Breazeal | 700/259 |
| 2014/0278354 A1* | 9/2014 | Ganong, III | 704/9 |
| 2014/0278401 A1* | 9/2014 | Ganong, III | 704/235 |
| 2014/0278429 A1* | 9/2014 | Ganong, III | 704/260 |
| 2014/0316771 A1* | 10/2014 | Short et al. | 704/201 |
| 2014/0350921 A1* | 11/2014 | Killalea et al. | 704/9 |
| 2014/0357450 A1* | 12/2014 | Sylvain | 482/8 |
| 2015/0051898 A1* | 2/2015 | Cuthbert et al. | 704/3 |

* cited by examiner

PLAYBACK CONTROL APPARATUS, PLAYBACK CONTROL METHOD, AND MEDIUM FOR PLAYING A PROGRAM INCLUDING SEGMENTS GENERATED USING SPEECH SYNTHESIS AND SEGMENTS NOT GENERATED USING SPEECH SYNTHESIS

BACKGROUND

The present technology relates to playback control apparatuses, playback control methods, and programs, and more specifically to a playback control apparatus, a playback control method, and a program which can provide new forms of entertainment by using the text-to-speech function.

In recent years, there has been an increase in the number of users who accumulate digitized audio data in sophisticated mobile phones (e.g., smartphones), tablet terminals, and the like and play the accumulated audio data to enjoy music while they are on the go or away from home.

Smartphones, tablet terminals, and the like also have a network connection function which allows the users to view desired web pages. However, this function is difficult to use in a situation where it is difficult to look at the screen, such as while moving.

Hitherto, a speech synthesis system ("text-to-speech" function) has been available which provides speech output of text information such as received emails and text on websites, e.g., news and weather information, by using a speech synthesis program (see, for example, Japanese Unexamined Patent Application Publication No. 2009-265279).

SUMMARY

In the related art, however, the text-to-speech function is targeted to one specific type of item specified to be read aloud, such as news or a received email, and it is difficult to read aloud a plurality of types of items desired by a user or to combine items to be read aloud and not to be read aloud.

It is therefore desirable to provide new forms of entertainment by using the text-to-speech function.

In an embodiment of the present technology, a playback control apparatus includes a playback controller configured to control playback of first content and second content, the first content including a portion of text information displayed on a screen to be output as read aloud speech using speech synthesis processing, the second content including a portion of the text information displayed on the screen not to be read aloud using the speech synthesis processing, wherein the playback controller causes an attribute of content to be played back to be displayed on the screen, the attribute indicating whether or not the content is to be read aloud using the speech synthesis processing.

In another embodiment of the present technology, a playback control method including controlling playback of first content and second content, the first content including a portion of text information displayed on a screen to be output as read aloud speech using speech synthesis processing, the second content including a portion of the text information displayed on the screen not to be read aloud using the speech synthesis processing; and displaying on the screen an attribute of content to be played back, the attribute indicating whether or not the content is to be read aloud using the speech synthesis processing.

In still another embodiment of the present technology, a program causes a computer to execute a process including controlling playback of first content and second content, the first content including a portion of text information displayed on a screen to be output as read aloud speech using speech synthesis processing, the second content including a portion of the text information displayed on the screen not to be read aloud using the speech synthesis processing; and displaying on the screen an attribute of content to be played back, the attribute indicating whether or not the content is to be read aloud using the speech synthesis processing.

In an embodiment of the present technology, the playback of first content including a portion of text information displayed on a screen to be output as read aloud speech using speech synthesis processing and second content including a portion of the text information displayed on the screen not to be read aloud using the speech synthesis processing is controlled, and an attribute of content to be played back, indicating whether or not the content is to be read aloud using the speech synthesis processing, is displayed on the screen.

The program may be provided by being transmitted via a transmission medium or being recorded on a recording medium.

The playback control apparatus may be an independent apparatus or may be an internal block included in a single apparatus.

An embodiment of the present technology may provide new forms of entertainment by using the text-to-speech function.

BRIEF DESCRIPTION OF THE DRAWINGS

FIG. 2 is a diagram illustrating the structure of a program serving as content available for a user to view and listen to;

DETAILED DESCRIPTION OF EMBODIMENTS

Example Configuration of Program Distribution System

Figure 1:
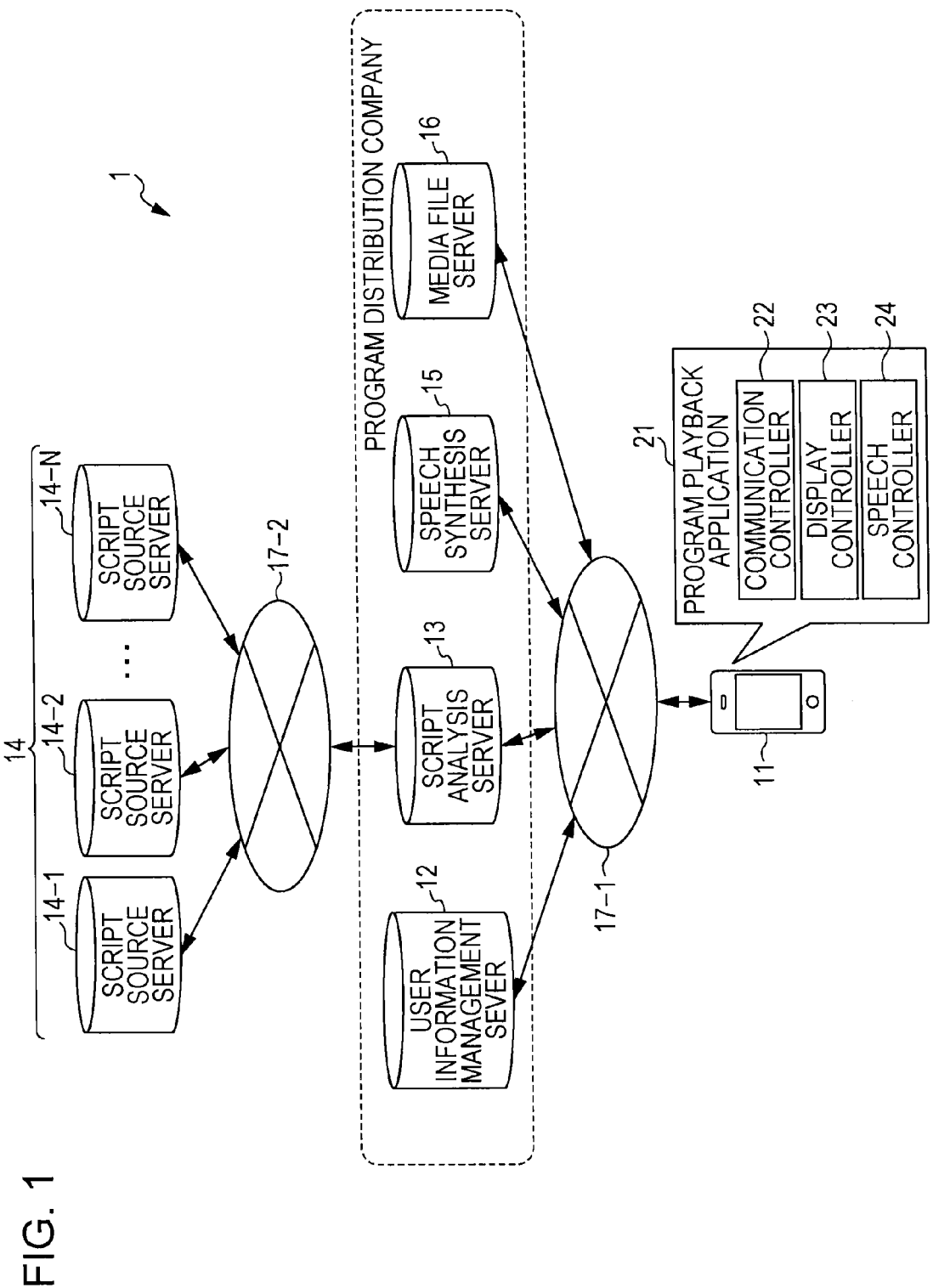
FIG. 1 is a diagram illustrating an example configuration of a program distribution system according to an embodiment of the present technology.

FIG. 1 illustrates an example configuration of a program distribution system 1 according to an embodiment of the present technology.

The program distribution system 1 illustrated in FIG. 1 is a system which provides a service for distributing to a mobile terminal 11 of a user a program (content) created by combining various kinds of text information which is information provided via a website, such as news, weather, and twitter feeds (or tweets), with audio data such as music. When a program is played back on the mobile terminal 11, the information making up the program, such as news, weather, and twitter feeds, is displayed on the screen and is also output as speech by using the text-to-speech function (speech synthesis processing). The user may thus be able to enjoy information provided on a certain website by listening to the information via speech as well as by viewing the information on the screen of the mobile terminal 11.

In the program distribution system 1, a program created by a program distribution company may be distributed to (the mobile terminal 11 of) the user. In addition, the program distribution system 1 may allow the user to create a program in accordance with their preference, to view and listen to the program, and to provide (or distribute) the program to other users.

In the program distribution system 1 illustrated in FIG. 1, the mobile terminal 11 operated by the user, a user information management server 12 managed by a program distribution company, a script analysis server 13, a speech synthesis server 15, and a media file server 16 are connected to one another via a network 17-1 such as a wired or wireless local area network (LAN), a mobile phone network, a public radio communication network, or the Internet.

The script analysis server 13 is also connected to a plurality of (in the illustrated example, N) script source servers 14-1 to 14-N via a network 17-2 such as a wired or wireless LAN, a mobile phone network, a public radio communication network, or the Internet. The networks 17-1 and 17-2 may be common (i.e., the same) or different.

The mobile terminal 11 is, for example, a sophisticated mobile phone called a smartphone, a tablet terminal, a mobile game console, a mobile music video player, or the like. The mobile terminal 11 has stored (or installed) therein a program playback application (or sometimes referred to as "app" for short) 21 which is an application program (software) for playing back a program created by a program distribution company or the like. The program playback application 21 is provided with playback controllers configured to control the playback of a program, and the playback controllers include a communication controller 22, a display controller 23, and a speech controller 24. The communication controller 22 is configured to control communication with each server of a program distribution company. The display controller 23 is configured to control the display of a program on the display of the mobile terminal 11. The speech controller 24 is configured to control speech output of the program.

The user information management server 12 manages information concerning users who use a program distribution service. Specifically, the user information management server 12 manages on a user-by-user basis registered-program information indicating the content of programs available for a user to view and listen to and previously played program information indicating a history of programs that have been viewed and listened to (or played back) by the user. The user information management server 12 also manages on a user-by-user basis authentication information including a user ID and a password a user uses to login, preference information of the user, setting information, and so forth.

Figure 2:
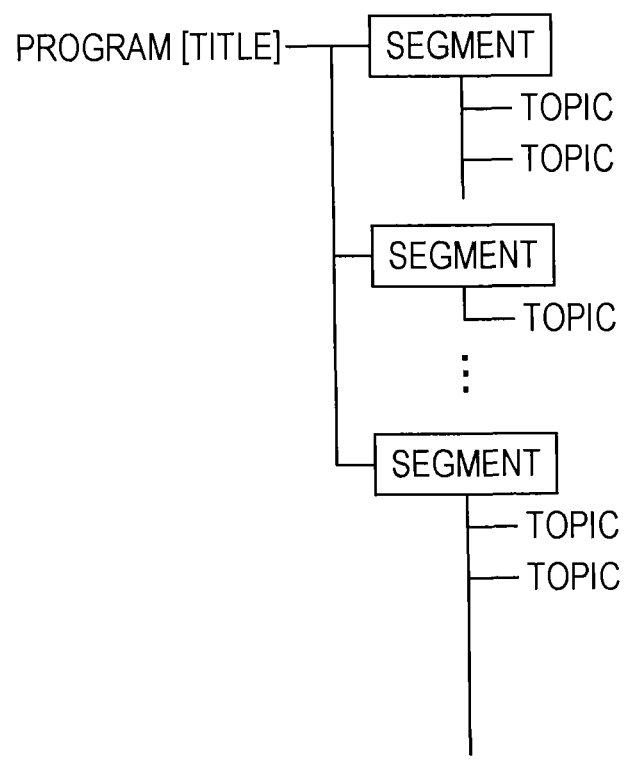

The structure of a program as content available for the user to view and listen to in the program distribution system 1 will be described with reference to FIG. 2.

A program available for the user to view and listen to is made up of one or more segments. Each segment includes one or more topics. Note that a segment made up of one topic may be sometimes defined as merely a segment.

Examples of topics may include distributed information about news, weather forecasts, fortune-telling services, and so forth, provided on certain web pages sponsored by information distribution companies such as newspaper and magazine publishers. Some of such distributed information include only text (text information) and others include text and video (still images, moving images).

Each topic may include audio data (audio files) of music, video, background music (BGM), sound effects, and audio commercials (CMs). Each topic may also include audio data and text information such as music and introductory text thereon. The audio data may be audio data created by a user, which may be stored in a cloud server, a local memory (a storage device of the terminal of the user), or the like, or may be audio data created by another user, such as music available via podcast or the like, items posted on a video posting site, or items available for trial use from a music distribution company. The audio data may also be an audiobook which is an audio file of a book that has been read aloud.

Each topic may also include comment information in social networking services (SNSs) such as message boards, blogs, and twitter feeds. Other examples of topics may include schedule information which is information about persons' past or future activities, and email information indicating the content of emails.

Among the topics described above, a plurality of topics such as a plurality of news articles and weather information available from the same web server may be combined into a single segment. In addition, a plurality of topics such as blog information and twitter feed information available from the same web server may also be combined into a single segment. In other words, segments are sub-classification items in which one or more topics are unified by common themes such as information distribution company, distribution server, and provided-information type, and topics are sub-sub-classification items classified from segments.

Referring back to FIG. 1, the script analysis server 13 accesses the script source servers 14-1 to 14-N to acquire content data that is the data of topics constituting a program (content), such as news, weather, and blog information, and stores the acquired content data. Further, the script analysis server 13 analyzes and modifies the content data acquired from the script source servers 14-1 to 14-N to create text-to-speech data used to read the acquired content data aloud, and stores the created text-to-speech data. The script analysis server 13 regularly or irregularly accesses each of the script source servers 14-1 to 14-N to acquire the latest content data.

Upon receiving a request for content data of topics constituting a program from the program playback application 21 of the mobile terminal 11, the script analysis server 13 transmits (or returns) the content data acquired from each of the script source servers 14-1 to 14-N (hereinafter collectively referred to as the "script source servers 14") in advance and stored in the script analysis server 13 to the program playback application 21. If the content data to be transmitted to the program playback application 21 contains text information, the script analysis server 13 also transmits text-to-speech data processed to read the text information aloud as speech to the program playback application 21 as part of the content data.

Each of the script source servers 14 provides the script analysis server 13 with content data for forming topics or segments of a program. The script source server 14 corresponds to, for example, a web server of an information distribution company such as a newspaper or magazine publisher, an SNS providing server, or the like.

The speech synthesis server 15 is a server that executes speech synthesis processing for converting text information into speech and outputting the speech. When text-to-speech data of a given topic is transmitted from the program playback application 21 of the mobile terminal 11, the speech synthesis server 15 executes speech synthesis processing using the text-to-speech data to produce audio data, and transmits (or returns) the audio data to the program playback application 21.

The program playback application 21 of the mobile terminal 11 may have the text-to-speech function and may execute speech synthesis processing. In this case, the speech synthesis server 15 may be omitted. Alternatively, whether to use the text-to-speech function of the program playback application 21 or the text-to-speech function of the speech synthesis server 15 may be determined in accordance with the setting of the program playback application 21, or the text-to-speech function of the speech synthesis server 15 may be used as a supplement.

The media file server 16 stores audio data (audio files) of music, video, BGM, sound effects, and audio CMs. Upon receiving a request for audio data constituting topics of a program from the program playback application 21 of the mobile terminal 11, the media file server 16 transmits (or returns) the requested audio data to the program playback application 21. The media file server 16 may also store CMs with video and audio, music video, and audio/video data (AV data) of moving images posted on moving image posting sites, and transmit such data in response to a request from the program playback application 21.

The audio data transmitted from the speech synthesis server 15 or the media file server 16 may be, for example, streaming data.

The program distribution system 1 has the foregoing configuration.

The user information management server 12, the script analysis server 13, the speech synthesis server 15, and the media file server 16, which are managed by a program distribution company, may be implemented by a single server or by two, three, or more than four servers. In addition, some functions of each server may be run by a company different from the program distribution company.

Furthermore, all or part of the processing performed by the script analysis server 13, the speech synthesis server 15, and the like may be executed by the program playback application 21 of the mobile terminal 11. In other words, the sharing of the processing performed by each server and the processing performed by the program playback application 21 of the mobile terminal 11 may be appropriately determined in accordance with the processing capabilities of the mobile terminal 11.

UI of Program Playback Application

Next, user interface (UI) screens of the program playback application 21, which may be displayed on the display of the mobile terminal 11, will be described with reference to FIGS. 3 to 11.

Login Screen

Figure 3:
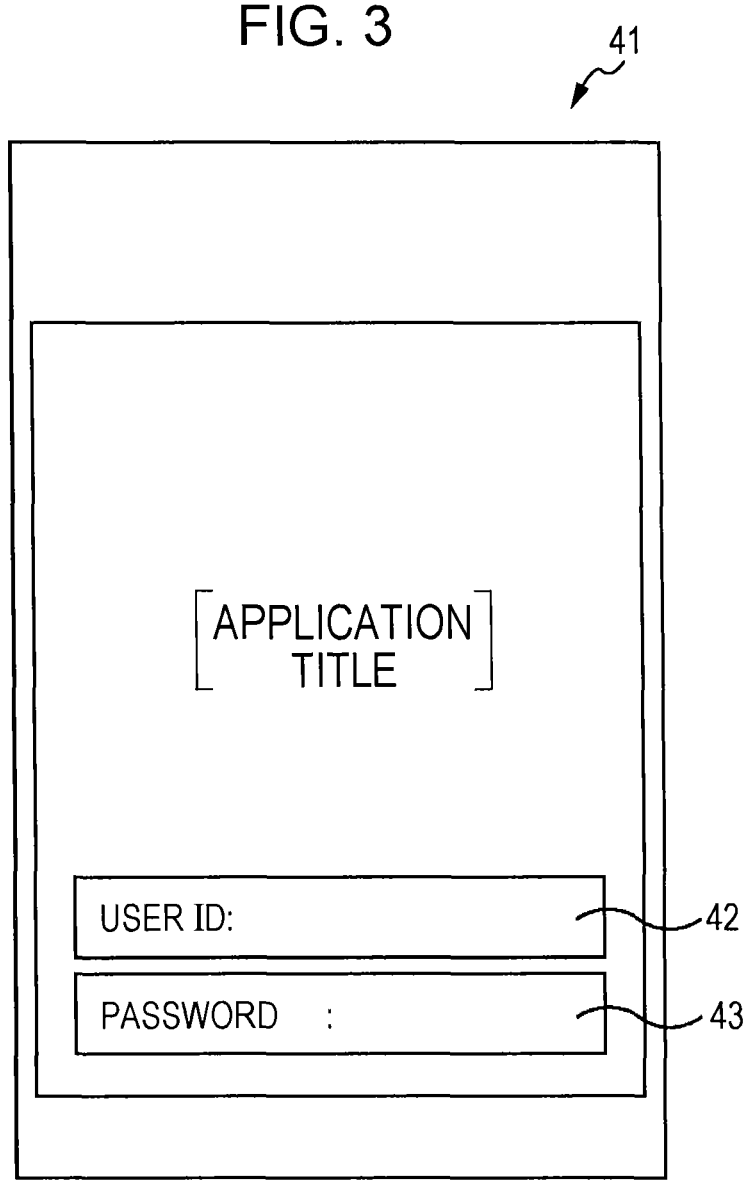
FIG. 3 is a diagram illustrating an example screen configuration of a login screen.

FIG. 3 illustrates an example screen configuration of a login screen displayed when the program playback application 21 is activated.

A login screen 41 illustrated in FIG. 3 presents the name of the program playback application 21 ("application title") in the center thereof. The login screen 41 further presents a user ID input field 42 and a password input field 43 at predetermined positions thereof. The user ID input field 42 allows a user to type a user ID for identifying the user, and the password input field 43 allows the user to type a password.

The user ID entered in the user ID input field 42 and the password entered in the password input field 43 are transmitted to the user information management server 12, and are checked against authentication information about registered users by the user information management server 12.

Example Screen Configuration of Home Screen

Figure 4:
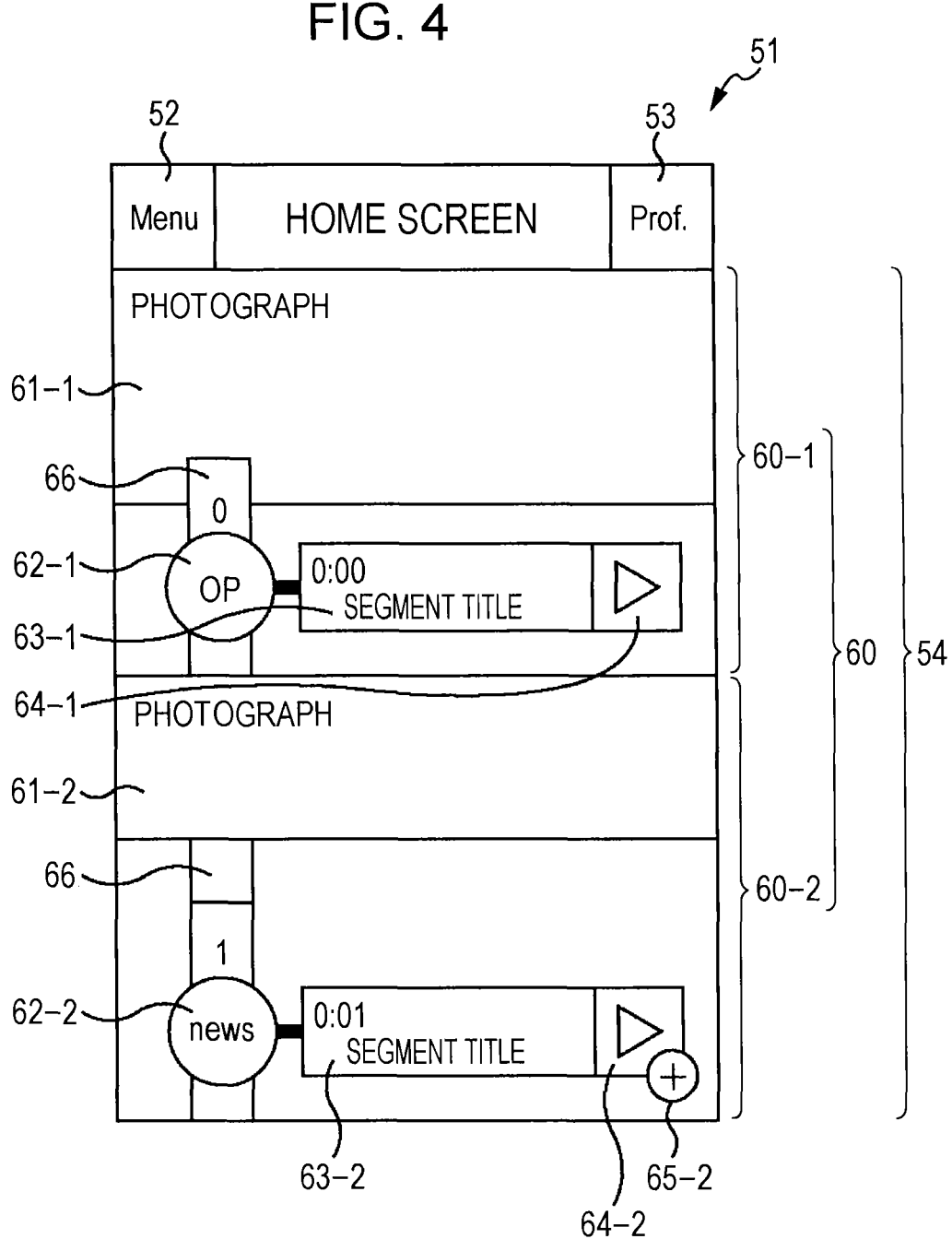
FIG. 4 is a diagram illustrating an example screen configuration of a home screen.

FIG. 4 illustrates an example screen configuration of a home screen displayed during the playback of a program.

A home screen 51 illustrated in FIG. 4 presents a menu jump button 52 and a playback history jump button 53 in an upper portion thereof. The menu jump button 52 is operated when the user wishes the screen to transition to a menu screen 121 (FIG. 9). The playback history jump button 53 is operated when the user wishes the screen to transition to a playback history screen 111 (FIG. 8) on which the profile and playback history of the user are displayed.

The home screen 51 further presents a segment display section 54 in which segments constituting a program are sequentially displayed. In the segment display section 54, segments 60 constituting a program are arranged vertically in the order of being played back, such as a segment 60-1 and a segment 60-2.

Figure 5:
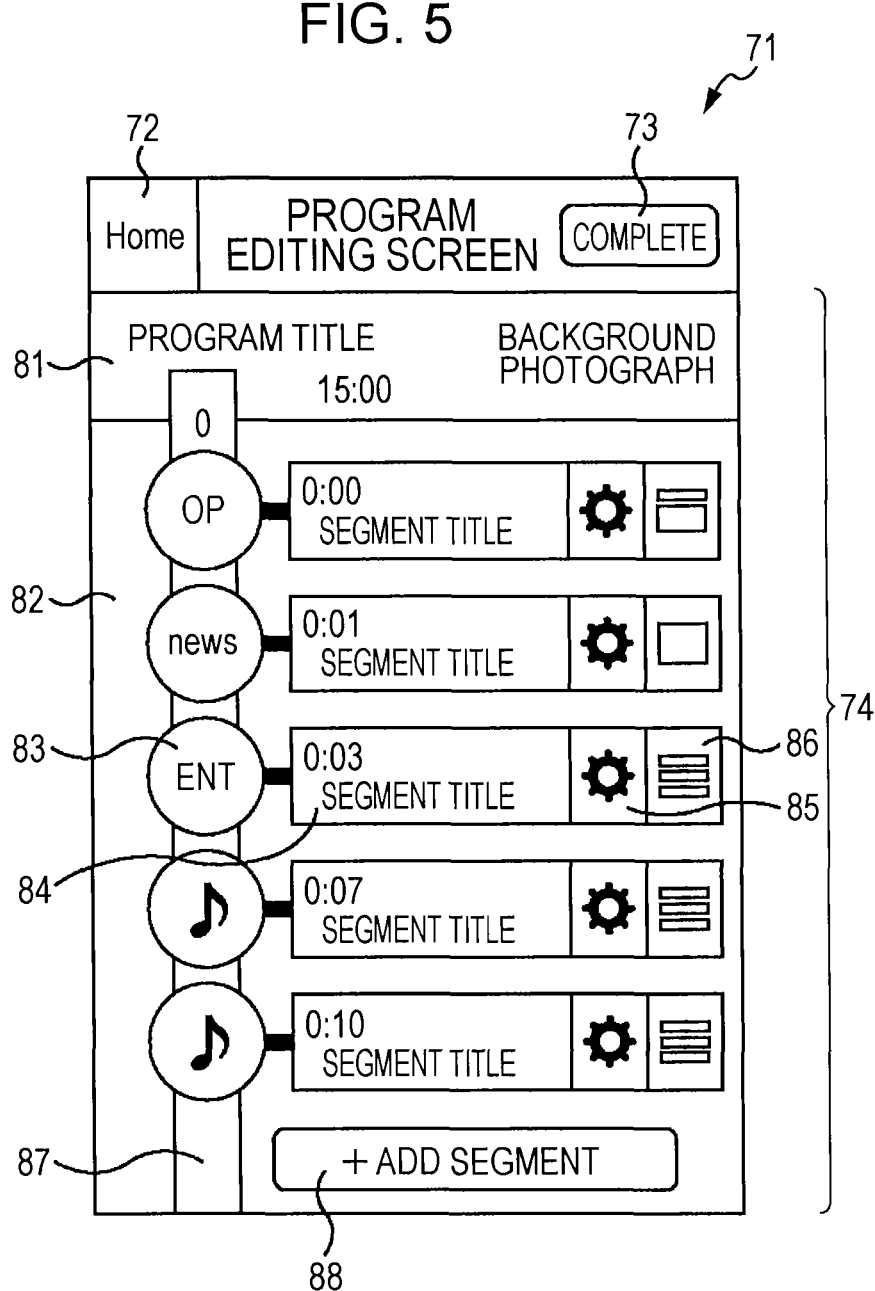
FIG. 5 is a diagram illustrating an example screen configuration of a program editing screen.

Each of the segments 60 includes a segment image 61, a segment icon 62, a segment title 63, and a segment jump button 64. The segment image 61 is a photograph or illustration that helps the user understand the content of the segment. The segment icon 62 indicates the genre (attribute) of the segment. The segment jump button 64 is operated when the user wishes to jump to the segment to immediately start playback. Among the segments 60 constituting the program, a segment 60 the user can edit such as add or delete is presented with a program editing jump button 65 near the segment jump button 64 to allow the screen to transition to a program editing screen 71 (FIG. 5).

More specifically, the segment 60-1 is provided with a segment image 61-1, a segment icon 62-1, a segment title 63-1, and a segment jump button 64-1. The segment 60-2 is provided with a segment image 61-2, a segment icon 62-2, a segment title 63-2, a segment jump button 64-2, and a program editing jump button 65-2.

The segment display section 54 includes a time line 66 explicitly indicating the current playback position. The time line 66 is provided so as to extend across the segments 60.

The user makes a gesture by touching the segment display section 54 on the display with their finger or fingers and sliding their finger or fingers in a vertical direction in which the segments 60 are arranged. This allows other segments 60 hidden due to the limited display area to be displayed. The user can start the playback of a desired one of the segments 60 by checking the content of the individual segments 60 and tapping on the segment jump button 64 of the desired segment 60.

Example Screen Configuration of Program Editing Screen

FIG. 5 illustrates an example screen configuration of the program editing screen 71 displayed in response to a tap on the program editing jump button 65 illustrated in FIG. 4.

The program editing screen 71 illustrated in FIG. 5 has a home jump button 72, a "Complete" button 73, and a program structure display section 74. The home jump button 72 is operated when the user wishes the screen to transition to the home screen 51 (FIG. 4). The "Complete" button 73 is used to complete the editing of the program and reflect the content of the edited program. The program structure display section 74 is an area where the structure of the program is displayed.

The program structure display section 74 includes a program title display section 81 where the title and playback duration of a program are displayed, and a segment display section 82 where segments constituting the program are shown.

In the segment display section 82, an icon 83, a segment title display section 84, a detail setting button 85, and a change button 86 are arranged for each of the segments constituting the program.

Each of the icons 83 represents the genre (attribute) of the associated segment. The icons 83 are arranged along a time line 87 in a manner similar to that on the home screen 51 (FIG. 4).

Each of the segment title display sections 84 presents the title and playback duration of the associated segment. The detail setting button 85 is operated to set the details of the segment. For example, for a fortune-telling service segment, the detail setting button 85 may be used to set information necessary to display information concerning the segment, such as the user's zodiac sign or blood type. With the change buttons 86, the user may change the order of the segments in the program and delete a segment.

An "Add Segment" button 88 operated to add a segment is further provided at a predetermined position on the segment display section 82. In response to a tap (or press) on the "Add Segment" button 88 by the user, an additional segment genre selection screen 91 illustrated in FIG. 6 is displayed on the display.

Example Screen Configuration of Added-Segment Genre Selection Screen

Figure 6:
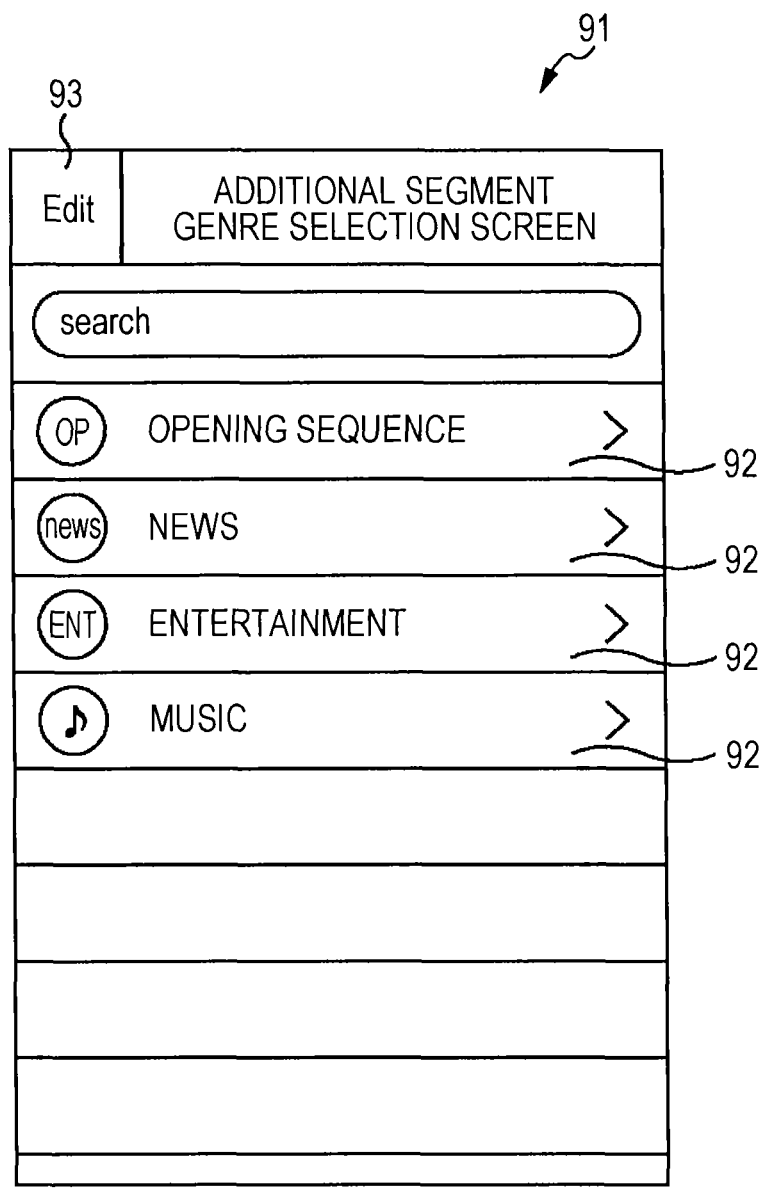
FIG. 6 is a diagram illustrating an example screen configuration of an additional segment genre selection screen.

FIG. 6 illustrates an example screen configuration of the additional segment genre selection screen 91 which allows the user to select the genre of a segment the user wishes to add.

The additional segment genre selection screen 91 presents genre buttons 92 indicating selectable genres. In the example illustrated in FIG. 6, genre buttons 92 indicating "opening sequence ('OP')", "news", "entertainment ('Ent')", and "music" are displayed. The user taps on the genre button 92 indicating the genre of the segment the user wishes to add.

A program editing jump button 93 located in an upper left corner of the additional segment genre selection screen 91 is operated when the user wishes to return to the program editing screen 71 illustrated in FIG. 5.

For example, the user wishes to add a segment belonging to the "news" genre and taps on the "news" genre button 92. Thus, an additional segment selection screen 101 illustrated in FIG. 7 is displayed.

Example Screen Configuration of Additional Segment Selection Screen

Figure 7:
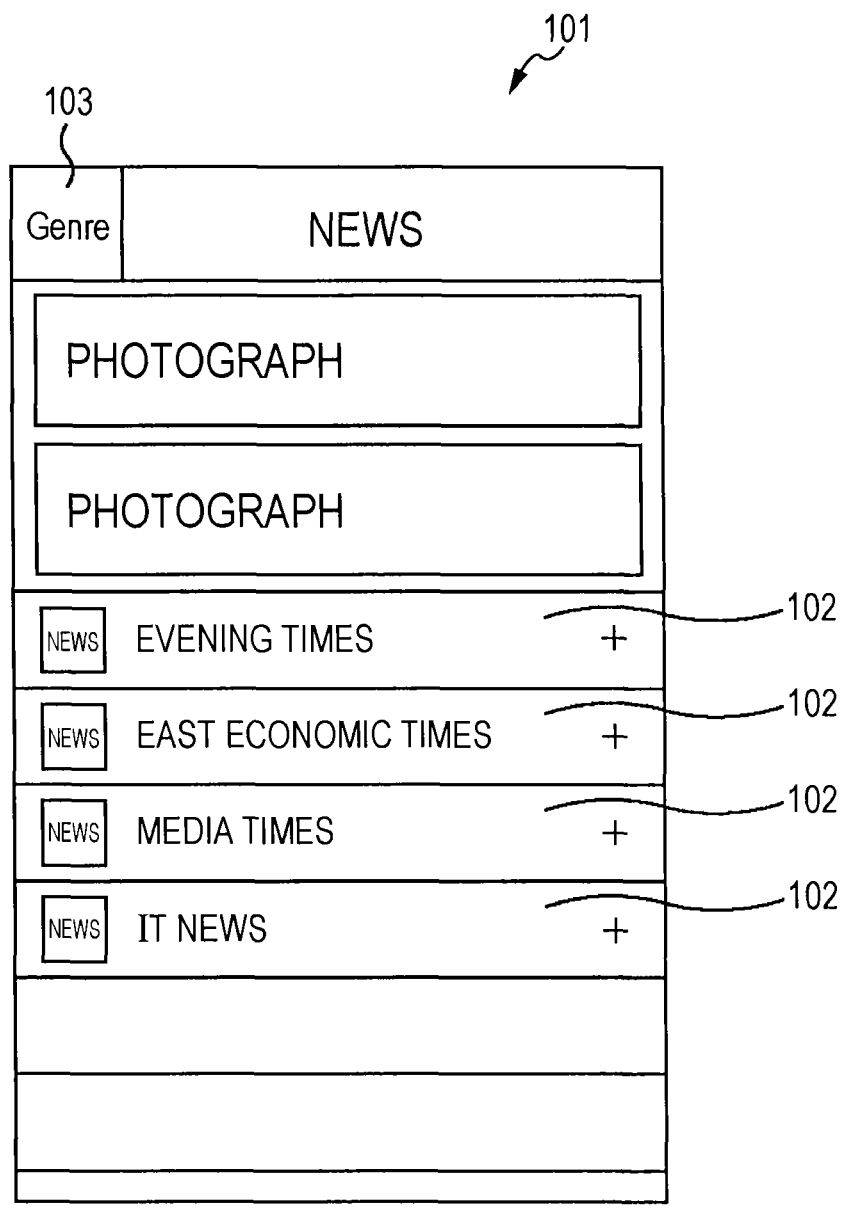
FIG. 7 is a diagram illustrating an example screen configuration of an additional segment selection screen.

FIG. 7 illustrates an example screen configuration of the additional segment selection screen 101 which allows the user to add a segment belonging to the "news" genre.

The additional segment selection screen 101 illustrated in FIG. 7 presents segment buttons 102 indicating available segments belonging to the "news" genre selected on the additional segment genre selection screen 91 illustrated in FIG. 6. In the example illustrated in FIG. 7, segment buttons 102 indicating "Evening Times", "East Economic Times", "Media Times", and "IT News" are displayed. In response to a user's tap on the segment button 102 indicating one of the segments the user wishes to add, the corresponding segment is added as one of the segments of the program being edited. Then, the screen of the display returns to the program editing screen 71 illustrated in FIG. 5.

A genre selection jump button 104 located in an upper left corner of the additional segment selection screen 101 is operated when the user wishes to return to the additional segment genre selection screen 91 illustrated in FIG. 6.

Example Screen Configuration of Playback History Screen

Figure 8:
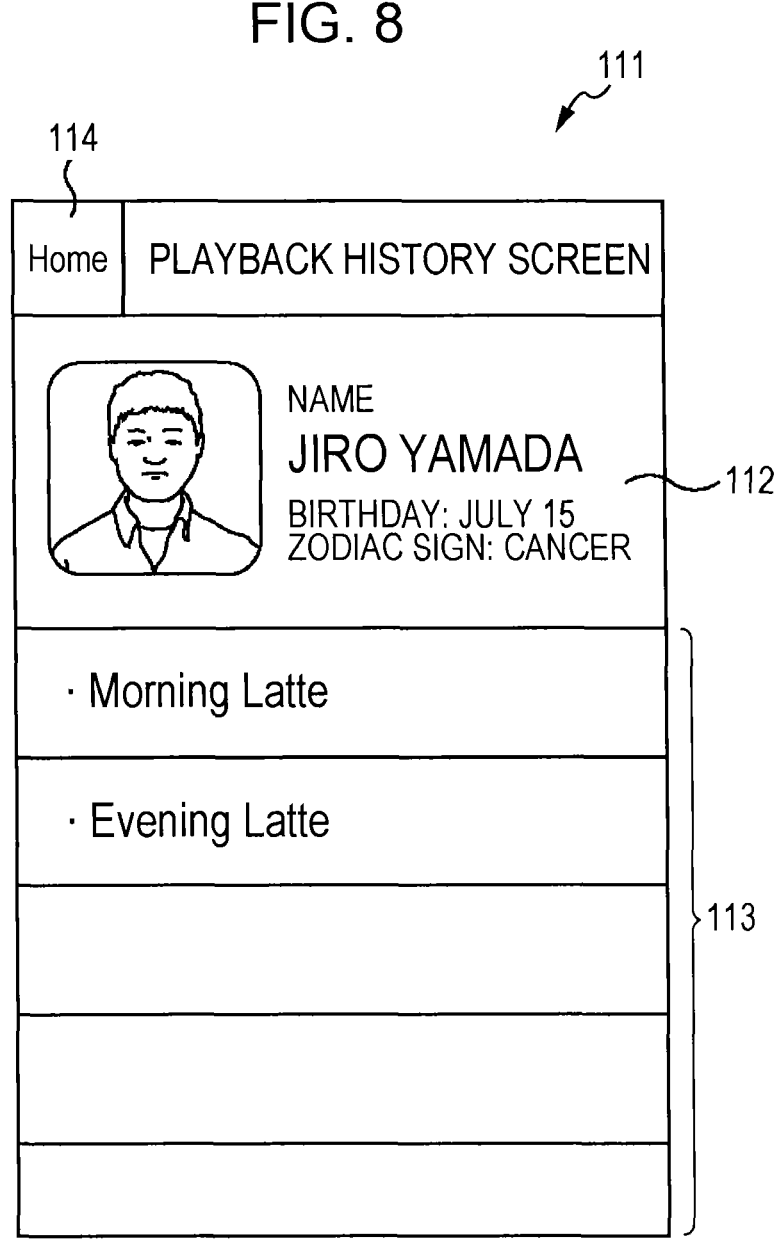
FIG. 8 is a diagram illustrating an example screen configuration of a playback history screen.
Figure 9:
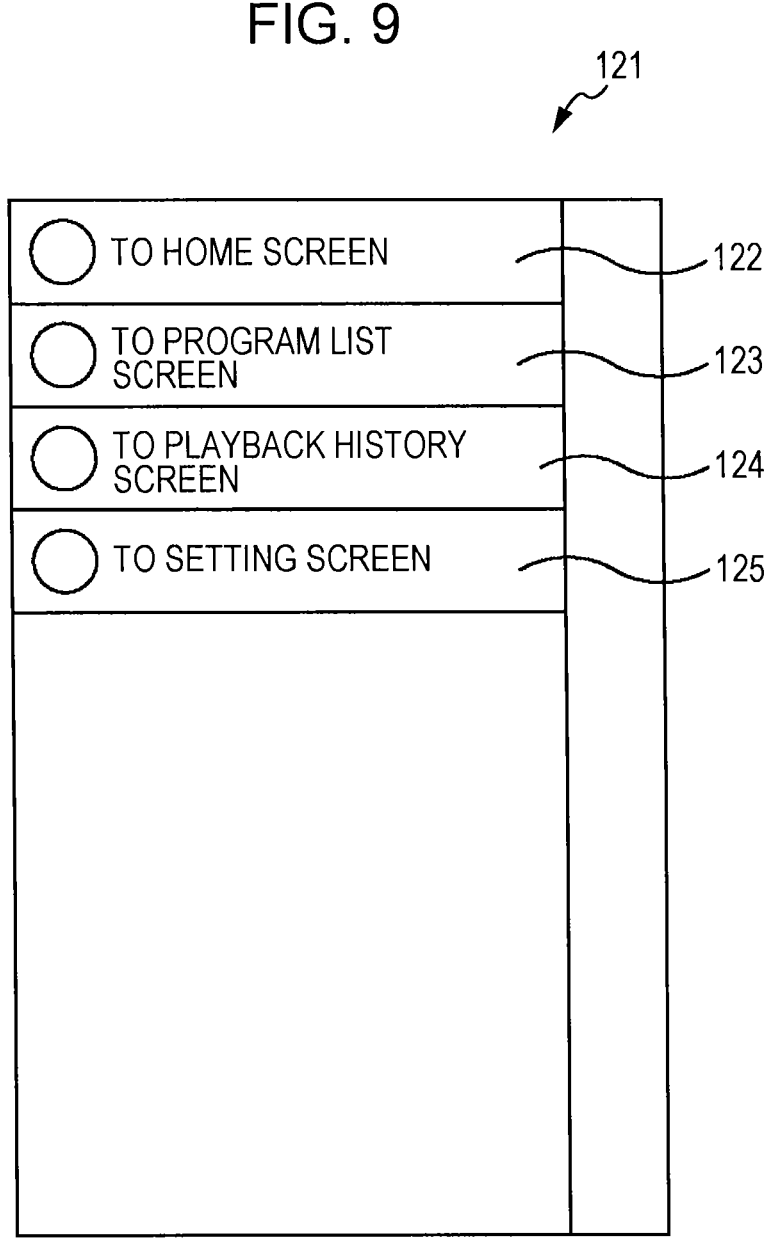
FIG. 9 is a diagram illustrating an example screen configuration of a menu screen.

FIG. 8 illustrates an example screen configuration of the playback history screen 111 on which the history of programs the user has previously played back is displayed.

As illustrated in FIG. 8, the playback history screen 111 includes a profile display section 112, a played-program display section 113, and a home jump button 114.

The profile display section 112 presents the profile of the user, such as name, full-face photograph (face image), birthday, and zodiac sign. Registered preference information of the user may also be displayed in the profile display section 112.

The history of programs the user has previously played back is displayed in the played-program display section 113. In the example illustrated in FIG. 8, the program "Morning Latte", which is designed to be viewed and listened to in the morning, and the program "Evening Latte", which is designed to be viewed and listened to in the evening, are displayed as programs the user has previously played back (or viewed and listened to).

The home jump button 114 is operated when the user wishes the screen to transition to the home screen 51 illustrated in FIG. 4.

Example Screen Configuration of Menu Screen

FIG. 9 illustrates an example screen configuration of the menu screen 121.

Figure 10:
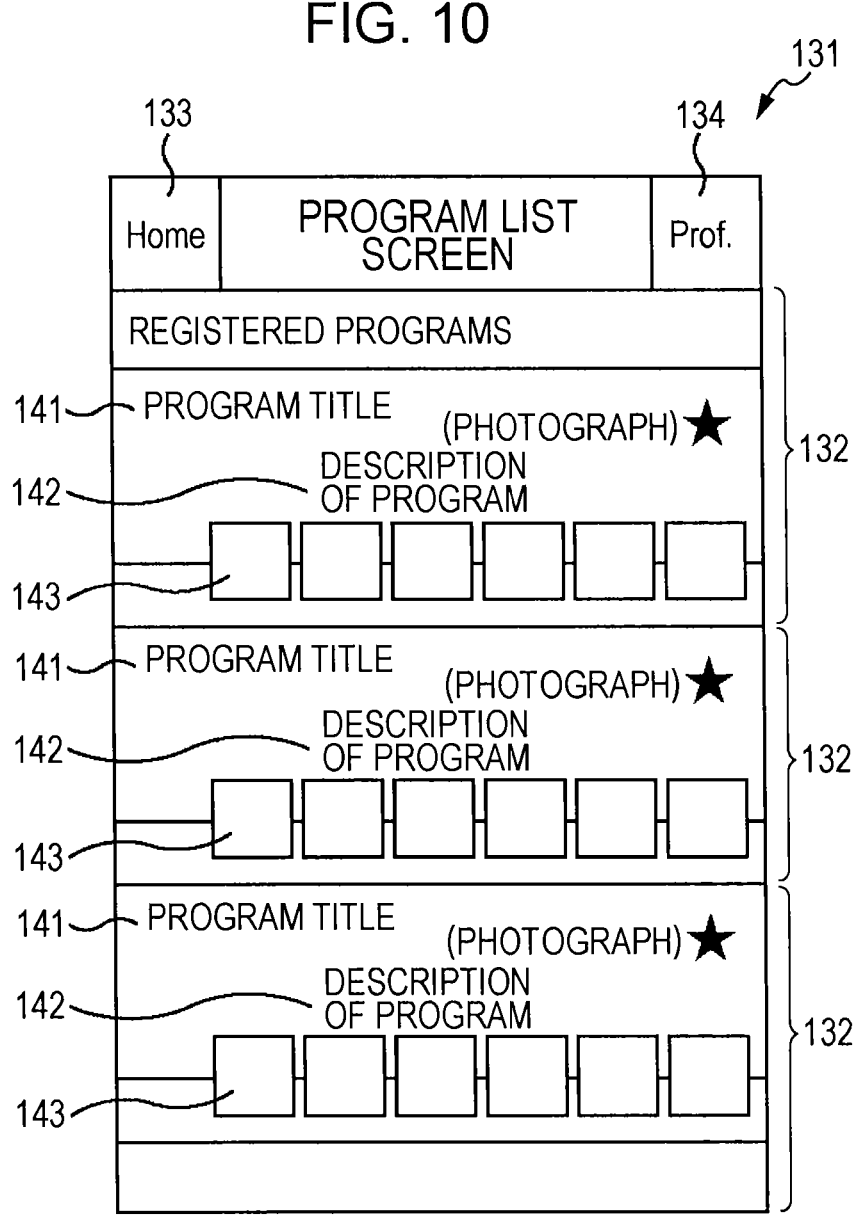
FIG. 10 is a diagram illustrating an example screen configuration of a program list screen.

As illustrated in FIG. 9, the menu screen 121 includes a home screen jump button 122, a program list screen jump button 123, a playback history screen jump button 124, and a setting screen jump button 125. The home screen jump button 122 is operated to display the home screen 51 (FIG. 4). The program list screen jump button 123 is operated to display a program list screen 131 (FIG. 10). The playback history screen jump button 124 is operated to display the playback history screen 111 (FIG. 8). The setting screen jump button 125 is operated to display a setting screen 151 (FIG. 11) which allows the user to make the settings of the program playback application 21.

Example Screen Configuration of Program List Screen

FIG. 10 illustrates an example screen configuration of the program list screen 131.

The program list screen 131 illustrated in FIG. 10 presents a list of programs available for the user to view and listen to. The programs available for the user to view and listen to include a program created by the user and a program provided free of charge or for a fee by a program distribution company or any other user. The program playback application 21 accesses the user information management server 12 to display a list of programs available for the user to view and listen to on the basis of registered-program information including a registered-program list that is a list of programs available for the user to view and listen to.

The program list screen 131 presents a program description section 132 for each program available for the user to view and listen to.

Each of the program description sections 132 presents a program title 141, a program content description 142, and segment icons 143 representative of segments constituting the program. Similarly to the segment icons 62 on the home screen 51, which is a screen indicating that the program is being currently played back, the segment icons 143 of the segments represent the genres (attributes) of the segments, and are arranged in the order of being played back in the program. If a photograph (thumbnail image) corresponding to the program has been registered, the photograph is displayed as a background image so that the photograph, the program title 141, and the program content description 142 are displayed in a superimposed manner.

A home jump button 133 located in an upper left corner of the program list screen 131 is operated when the user wishes the screen to transition to the home screen 51 illustrated in FIG. 4. A playback history jump button 134 located in an upper right corner of the program list screen 131 is operated when the user wishes the screen to transition to the playback history screen 111 illustrated in FIG. 8.

The user can play back a desired program by tapping on the program description section 132 associated with the desired program on the program list screen 131. In response to a user's tap on the program description section 132 associated with the program the user wishes to play back, the playback of the program is started, and the screen of the mobile terminal 11 transitions to the home screen 51 of the program to be played back illustrated in FIG. 4.

Screen Transition Sequence

Figure 11:
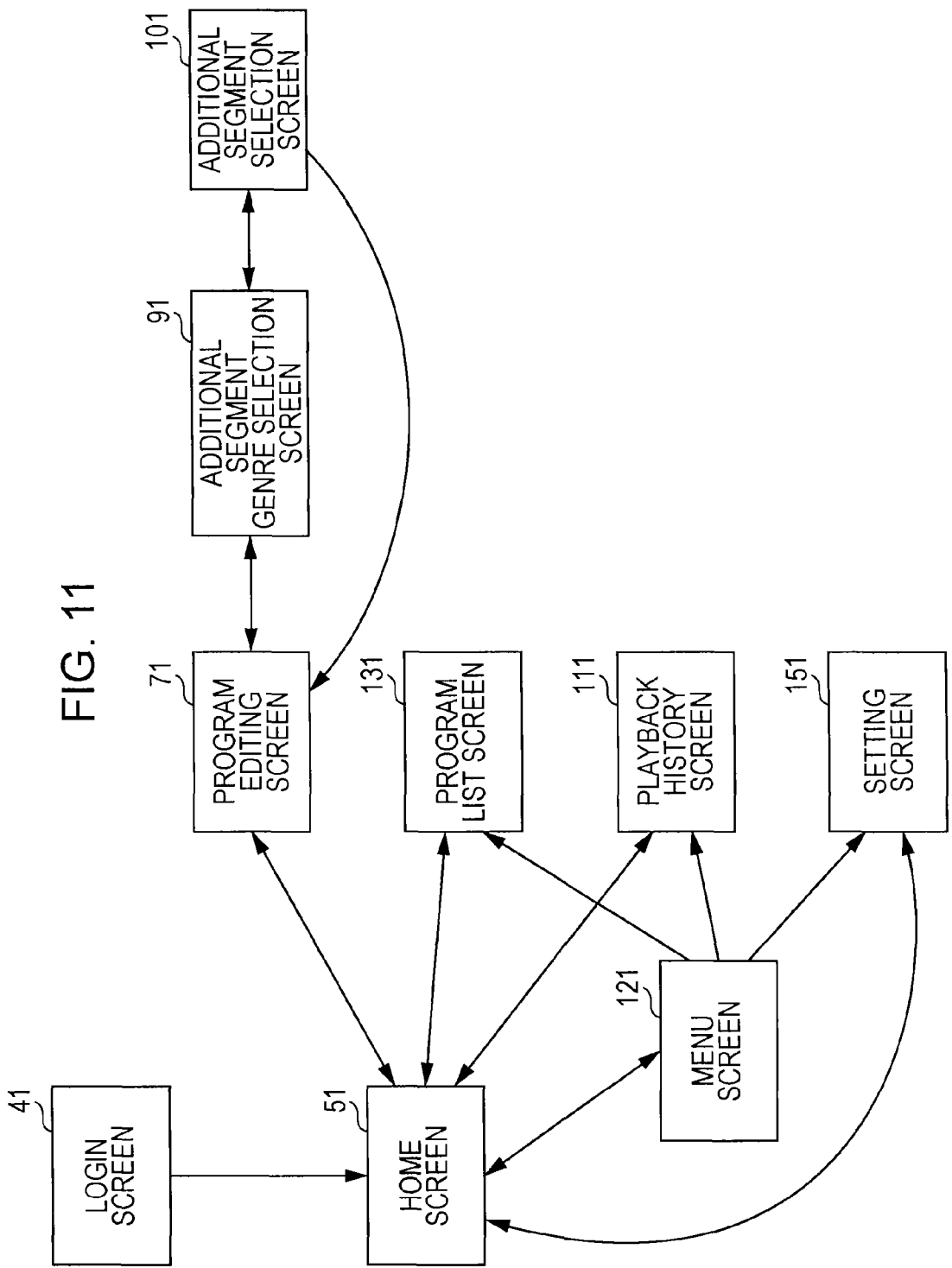
FIG. 11 is a diagram illustrating a screen transition sequence of screens.

FIG. 11 illustrates a screen transition sequence of the screens illustrated in FIGS. 3 to 10.

When the program playback application 21 is activated, initially, the login screen 41 illustrated in FIG. 3 is displayed. When a user ID and a password are entered on the login screen 41 and a user is authenticated, the home screen 51 illustrated in FIG. 4 is displayed.

The home screen 51 may transition to the program editing screen 71 illustrated in FIG. 5, the playback history screen 111 illustrated in FIG. 8, the menu screen 121 illustrated in FIG. 9, the program list screen 131 illustrated in FIG. 10, and the setting screen 151.

The program editing screen 71 may transition to the additional segment genre selection screen 91 illustrated in FIG. 6, and the additional segment genre selection screen 91 may transition to the additional segment selection screen 101 illustrated in FIG. 7.

The menu screen 121 illustrated in FIG. 9 may transition to the home screen 51 illustrated in FIG. 4, the program list screen 131 illustrated in FIG. 10, the playback history screen 111 illustrated in FIG. 8, and the setting screen 151.

The setting screen 151 is a screen which allows the user to make the general settings of an application, such as the display method, behavior, and the like of UI screens of the program playback application 21.

Flowchart of Program Playback Process

Figure 12:
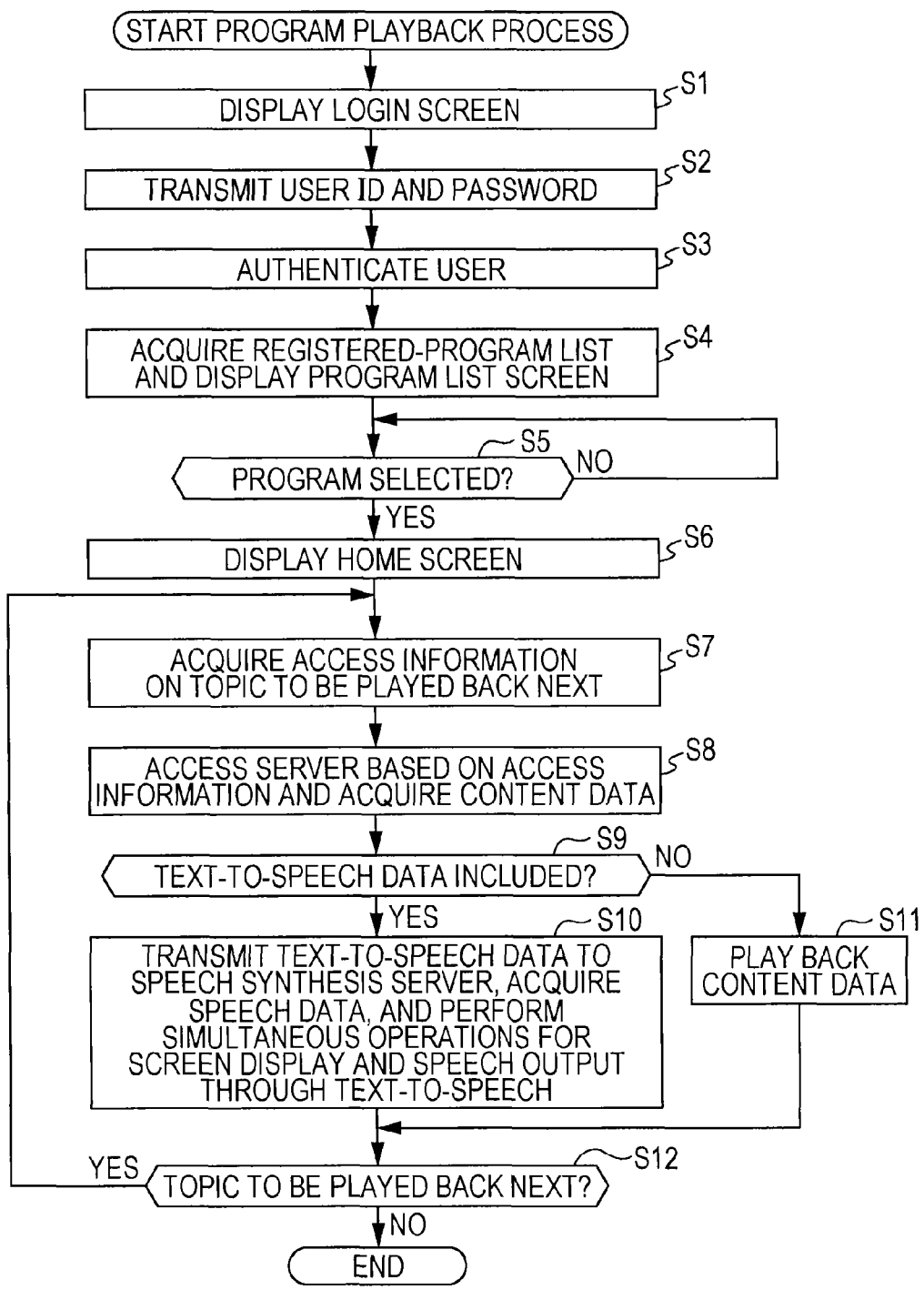
FIG. 12 is a flowchart illustrating a program playback process.

Next, a process for playing back a given program by using the program playback application 21 of the mobile terminal 11 will be described with reference to a flowchart of FIG. 12.

This process is started, for example, when the program playback application 21 is activated.

In step S1, the program playback application 21 displays the login screen 41 illustrated in FIG. 3 on the display of the mobile terminal 11. The login screen 41 is provided with the user ID input field 42 and the password input field 43.

In step S2, the program playback application 21 transmits the user ID and password entered by the user to the user information management server 12.

In step S3, the user information management server 12 receives the user ID and password transmitted from the program playback application 21, and authenticates the user on the basis of the user ID and the password. After the user has been authenticated, the user information management server 12 transmits a registered-program list that is a list of programs available for the user to view and listen to the program playback application 21 on the basis of the registered-program information of the user.

In step S4, the program playback application 21 acquires the registered-program list transmitted from the user information management server 12, and displays the program list screen 131 illustrated in FIG. 10 on the display on the basis of the registered-program list.

In step S5, the program playback application 21 determines whether or not a certain program has been selected as a program to be played back from among one or more programs displayed on the display, and waits until it is determined that a program has been selected.

If it is determined in step S5 that a certain program has been selected, the process proceeds to step S6. Then, the program playback application 21 displays on the display the home screen 51 (FIG. 4) of the program instructed to be played back.

If the user holds only one program or if the program to be played back is specified in advance by reservation of the program to be played back or the like, the processing of selecting a program to be played back in steps S4 and S5 described above is omitted. In this case, as in the screen transition sequence illustrated in FIG. 11, the login screen 41 instantly changes to the home screen 51 of the program to be played back.

In step S7, the program playback application 21 acquires, from the user information management server 12, access information concerning the topic to be played back next among one or more topics constituting the program selected to be played back.

The user information management server 12 has stored therein, for one or more topics constituting the program selected to be played back, access information indicating the address from which content data of each topic is acquired. If the topic is, for example, news distributed by the script source server 14, the access information may be information indicating a folder in the script analysis server 13 in which the news acquired from the script source server 14 is stored. If the topic is, for example, music stored in the media file server 16, the access information may be information indicating a folder in the media file server 16 in which audio data of the music is stored. The user information management server 12 transmits access information concerning the topic to be played back next among one or more topics constituting the program selected to be played back to the program playback application 21, and the program playback application 21 receives the access information.

In step S8, the program playback application 21 accesses the server specified by the access information in accordance with the access information concerning the topic acquired in step S7, and acquires content data.

For example, if the topic is news distributed by the script source server 14, the program playback application 21 accesses a folder in the script analysis server 13 based on the access information, and acquires content data.

For example, if the topic is music stored in the media file server 16, the program playback application 21 accesses a folder in the media file server 16 based on the access information, and acquires audio data of the music.

In step S9, the program playback application 21 determines whether or not the acquired content data includes text-to-speech data.

If it is determined in step S9 that the acquired content data includes text-to-speech data, the process proceeds to step S10. In step S10, the program playback application 21 transmits the text-to-speech data to the speech synthesis server 15, acquires speech data subjected to speech synthesis processing by the speech synthesis server 15, and performs simultaneous operations for screen display and speech output through text-to-speech based on the content data. For example, if the topic is news distributed by the script source server 14, the program playback application 21 displays a news article acquired from a folder in the script analysis server 13 on the display of the mobile terminal 11, and also outputs the speech of the news article that has been read aloud.

If it is determined in step S9 that the acquired content data includes no text-to-speech data, the process proceeds to step S11. Then, the program playback application 21 plays back the content data. For example, if the topic is music stored in the media file server 16, the program playback application 21 plays back audio data of the music.

In step S12, the program playback application 21 determines, based on the registered-program information in the user information management server 12, whether or not there is a topic to be played after the topic currently being played back.

If it is determined in step S12 that there is a topic to be played back next, the process returns to step S7, and the subsequent processing is executed again. That is, the processing of acquiring content data of the topic to be played back next and playing back the content data is executed.

If it is determined in step S12 that there is no topic to be played back next, the program playback process ends.

Accordingly, the program playback application 21 plays back a program by acquiring content data in units of topics constituting the program. Therefore, the program is played back.

In the example described above, for ease of description, after the playback of the current topic is completed, content data of the next topic is acquired. Actually, content data of the next topic is acquired in advance while the current topic is being played back so that the playback of the next topic can be started immediately after the playback of the current topic is completed.

First Specific Example of Home Screen

Next, two specific examples of a home screen will be described.

Figure 13:
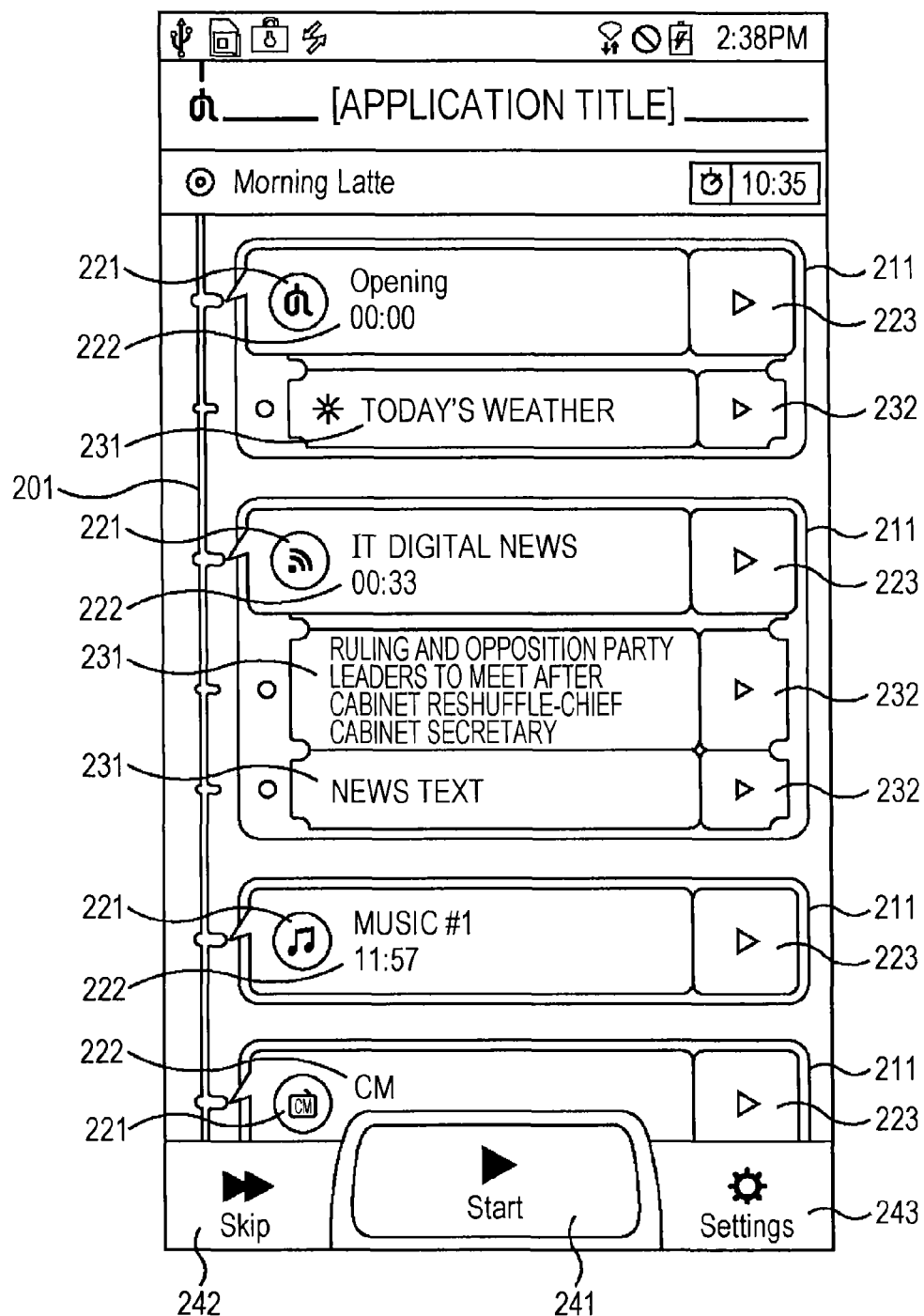
FIG. 13 is a diagram illustrating a first specific example of the home screen.

FIG. 13 illustrates a first specific example of a home screen on which the program with the program title "Morning Latte" is played back.

This home screen presents a time line 201 in the left portion thereof. The time line 201 is a representation in the time domain which allows the time length of the entire program and each segment (topic) and the time position of the playback point to be visually identified.

A plurality of segment display sections 211 are arranged on the right side of the time line 201 so as to be arranged from top to bottom in the playback order of the individual segments.

Each of the segment display sections 211 includes an icon 221 representative of the genre (attribute) of the associated segment, a title and playback start time 222 of the segment, and a jump button 223 operated when the user wishes to jump to the segment to start playback.

For a segment including one or more topics, a topic title 231 of the topic and a jump button 232 operated when the user wishes to jump to the topic for playback are also displayed.

On the home screen illustrated in FIG. 13, the segment display section 211 of the "opening sequence" segment including the topic "Today's Weather" is displayed to show the segment to be played back first, the segment display section 211 of the "IT Digital News" segment including two topics is displayed to show the segment to be played back second, the segment display section 211 of the "Music #1" segment is displayed to show the segment to be played back third, and the segment display section 211 of the "CM" segment is displayed to show the segment to be played back fourth. In this way, the arrangement of the segment display sections 211 on the right side of the time line 201 in the playback order of the segments constituting the program allows the user to understand at a single glance the structure of the entire program and each segment, the playback order of the individual segments, and the like. This may help the user easily understand the entire program.

As can be seen from the playback start times 222 in the segment display sections 211, the first segment, "opening sequence", is played back immediately after (0 minute and 0 second after) the start of playback of the program, the second segment, "IT Digital News", is played back 0 minute and 33 seconds after the start of playback of the program, and the third segment, "Music #1", is played back 11 minutes and 57 seconds after the start of playback of the program. Accordingly, the user may understand the timing when each segment is played back and its playback duration. In place of the time at which each segment is played back which is measured from the beginning of the program, the length of the playback duration of each segment may be displayed in the playback start time 222.

A play/stop button 241, a skip button 242, and a setting screen jump button 243, which are located in the lower portion of the home screen, are operation buttons common to the home screen and are displayed regardless of which program is to be played back. The play/stop button 241 is operated (by a tap) to start or stop the playback of a program. The skip button 242 is operated to move the playback target to the next topic or segment. The setting screen jump button 243 is operated to enter the setting screen of the program playback application 21.

Figure 14:
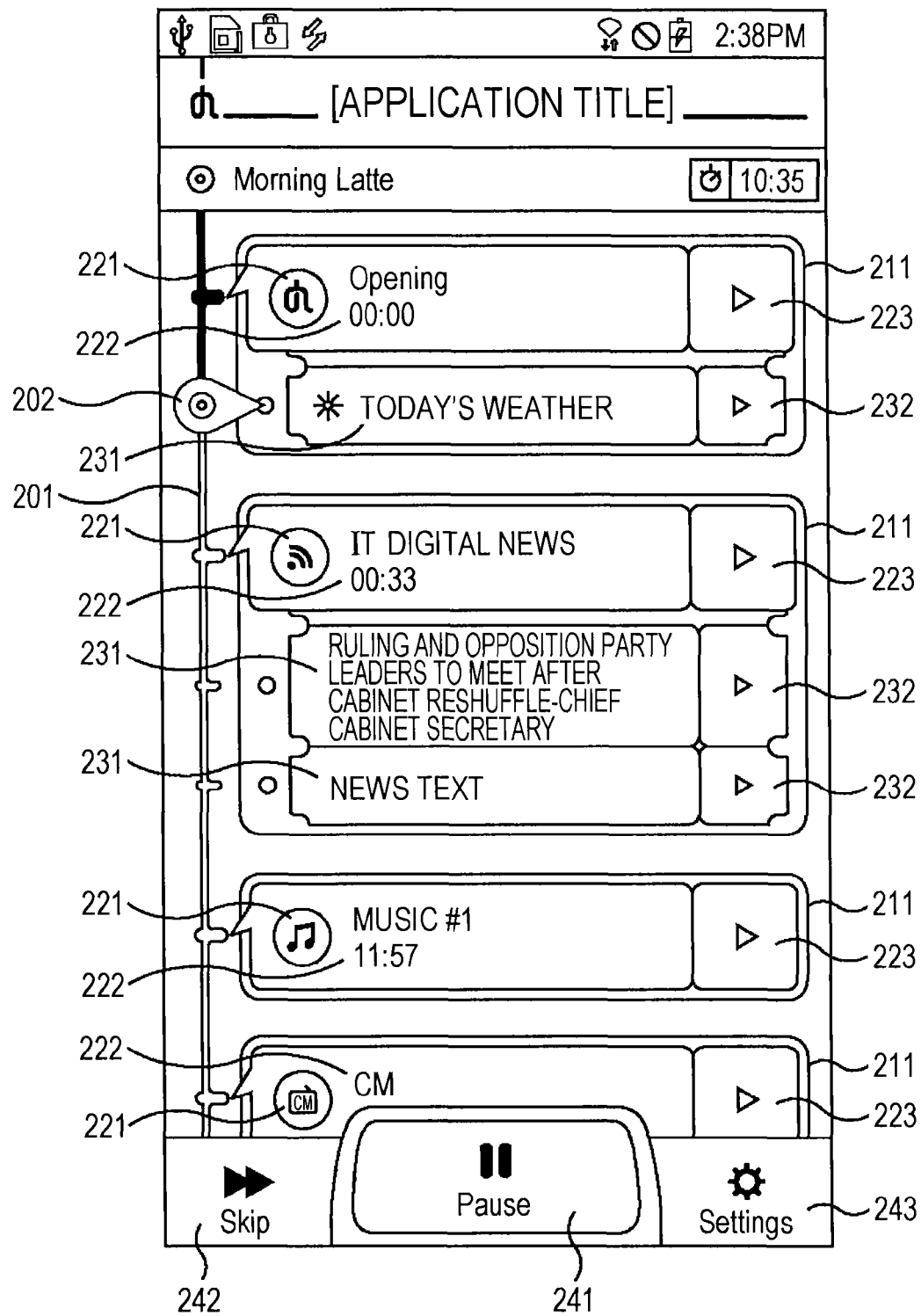
FIG. 14 is a diagram illustrating the first specific example of the home screen.

While the topic "Today's Weather" in the first segment, "opening sequence", of the program "Morning Latte" is currently being played back, a home screen illustrated in FIG. 14 is displayed. Specifically, an indicator 202 indicating the current playback position moves over the time line 201 and is displayed at the position of the topic "Today's Weather".

In the playback of the topic "Today's Weather" in the "opening sequence" segment, the program playback application 21 acquires text-to-speech data of the topic "Today's Weather" from the script source server 14, and provides speech output of "Today's Weather".

Figure 15:
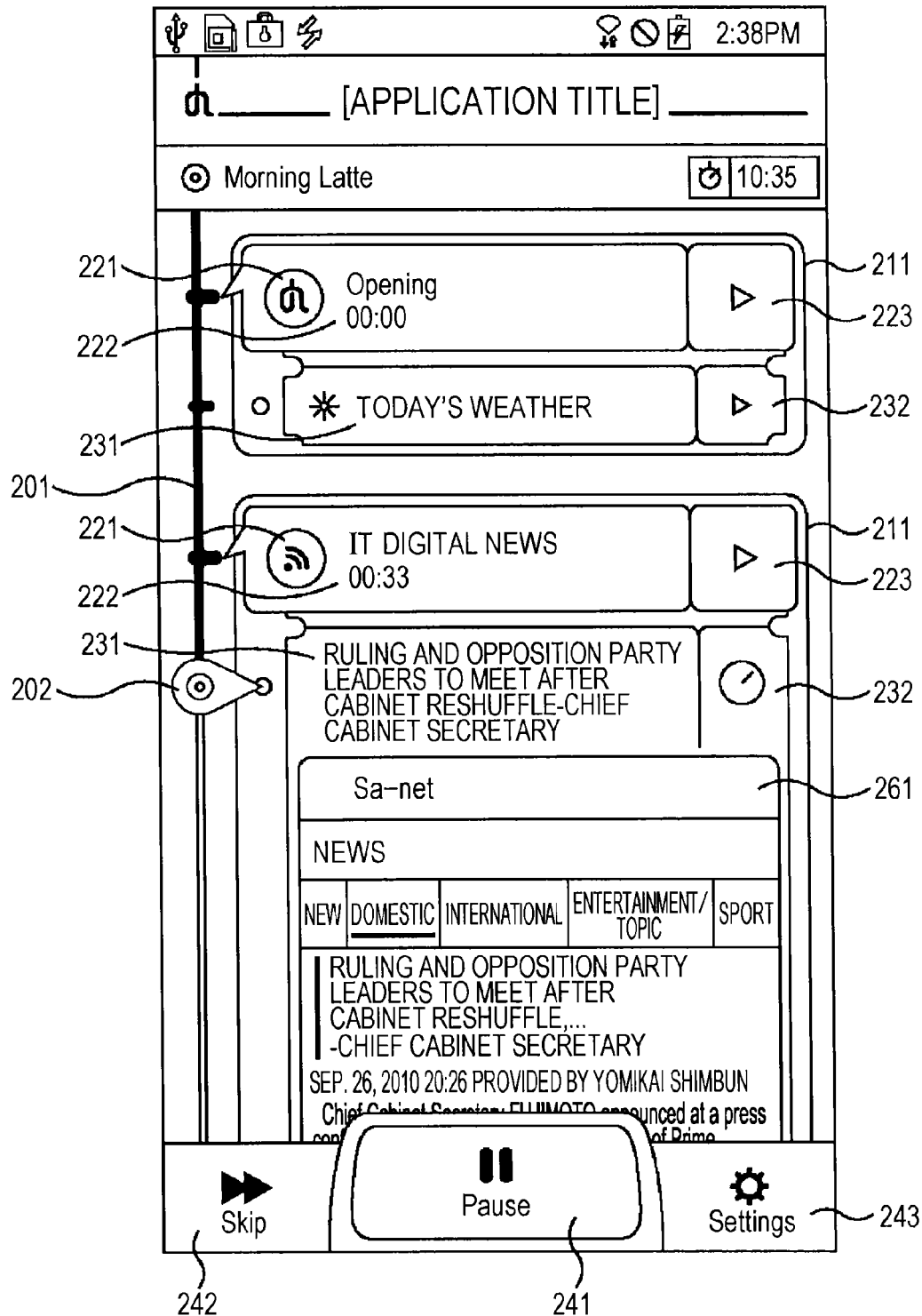
FIG. 15 is a diagram illustrating the first specific example of the home screen.

When the reading aloud of the topic "Today's Weather" is completed and the playback of the first topic in the next segment, "IT Digital News", namely, "Ruling And Opposition Party Leaders To Meet After Cabinet Reshuffle—Chief Cabinet Secretary", is started, a home screen illustrated in FIG. 15 is displayed.

Specifically, the indicator 202 indicating the current playback position moves over the time line 201 to the position the topic "Ruling And Opposition Party Leaders To Meet After Cabinet Reshuffle—Chief Cabinet Secretary". Then, as illustrated in FIG. 15, the program playback application 21 displays below the topic title 231 a web screen 261 that is the same as the screen displayed on the website from which the topic "Ruling And Opposition Party Leaders To Meet After Cabinet Reshuffle—Chief Cabinet Secretary" has been acquired.

When the playback of the "IT Digital News" segment is started after the playback of the preceding segment, "opening sequence", is completed, the genre of the segment to be played back next may be presented to the user via speech, such as "Next is the news segment".

Alternatively, the site name or uniform resource locator (URL) of the script source server 14 from which the "IT Digital News" segment has been acquired may be displayed near, for example, the title and playback start time 222 in the segment display section 211 of the "IT Digital News" segment to explicitly show source information concerning the displayed content. In addition, the source information of the segment to be played back may be read aloud at the beginning or end of playback of the "IT Digital News" segment, such as "This segment is provided from 'IT News'".

The program playback application 21 reads the news article on the web screen 261 aloud (or outputs the news article via speech) on the basis of the text-to-speech data.

When reading the news article on the web screen 261 aloud, the program playback application 21 divides the read-aloud portion on the screen into predetermined units such as sentences, and displays the sentences in a highlighted (or emphasized) manner in synchronization with the read-aloud speech of the sentences. This allows the user to easily identify which portion of the news article on the web screen 261 is being read aloud.

Figure 16:
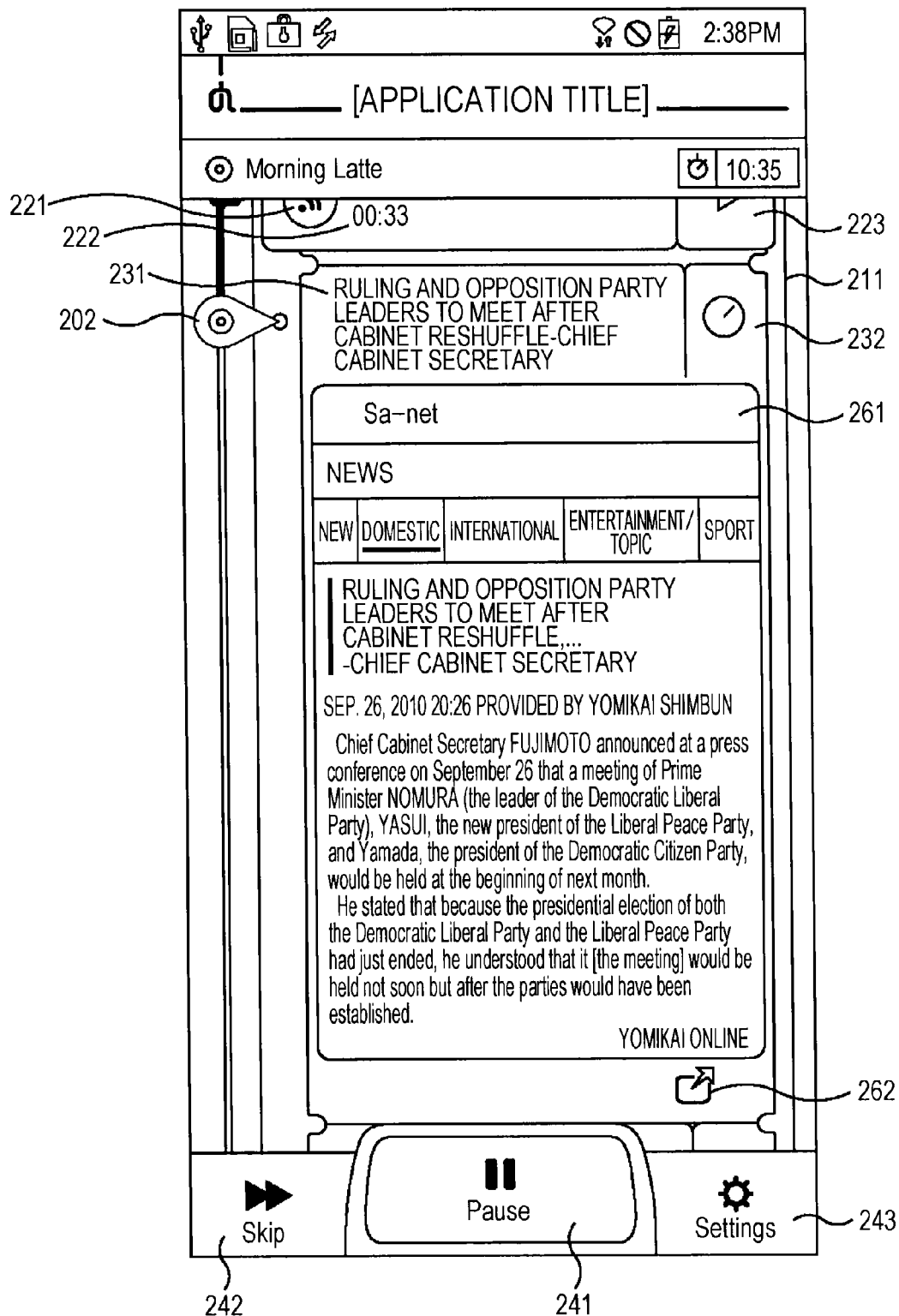
FIG. 16 is a diagram illustrating the first specific example of the home screen.

As illustrated in FIG. 16, a browser activation button 262 is provided below the web screen 261 displayed in a manner similar to the screen displayed on the website from which the data has been acquired. The user can tap on the browser activation button 262 to access the script source server 14 from which the topic being read aloud has been acquired to display the news article being read aloud on the web browser. The access information to the script source server 14 indicating the source from which the news article being read aloud has been acquired is included in, for example, the content data acquired from the script analysis server 13.

Figure 17:
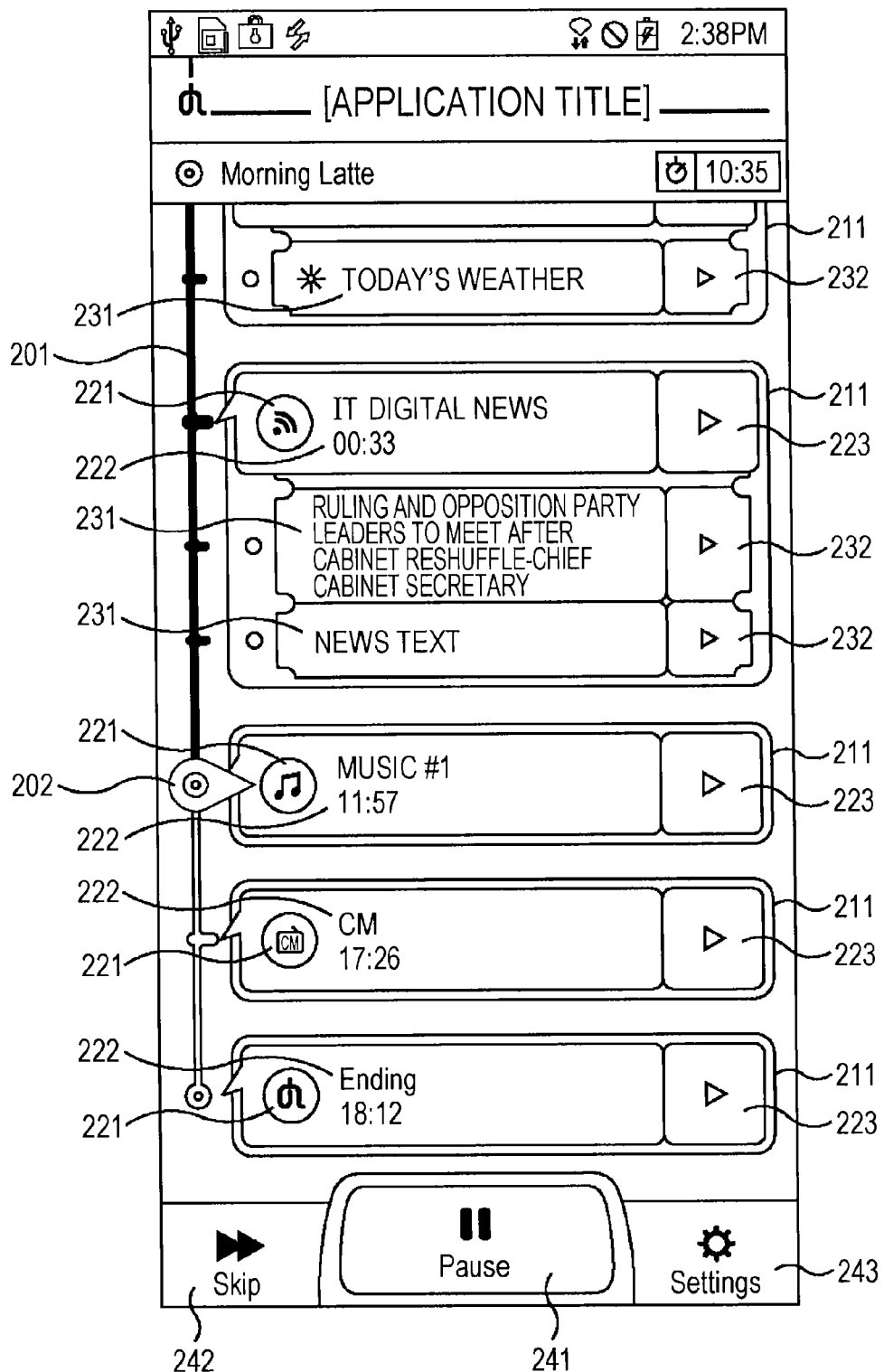
FIG. 17 is a diagram illustrating the first specific example of the home screen.

When the playback of the two topics in the "IT Digital News" segment is completed and the playback of the next segment, "Music #1", is started, a home screen illustrated in FIG. 17 is displayed. Specifically, the web screen 261 that has been displayed disappears, and the indicator 202 moves over the time line 201 to the position of the "Music #1" segment.

Figure 18:
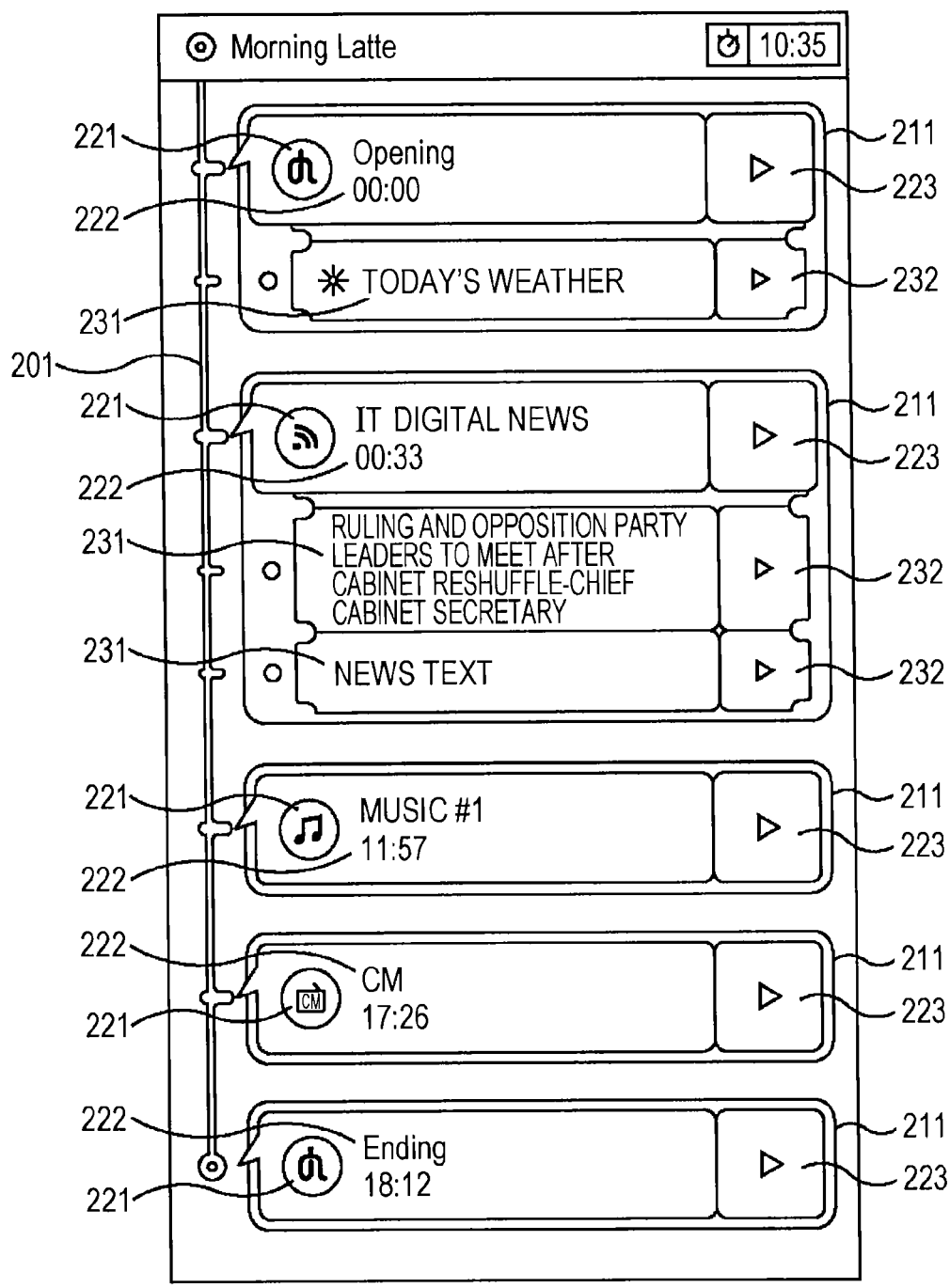
FIG. 18 is a diagram illustrating the entire structure of the program "Morning Latte"

FIG. 18 illustrates the entire structure of the program "Morning Latte".

The program "Morning Latte" is made up of five segments, namely, the first segment, "opening sequence", the second segment, "IT Digital News", the third segment, "Music #1", the fourth segment, "CM", and the fifth segment, "ending sequence".

In the playback of the "opening sequence" segment, the program playback application 21 acquires the content data (text-to-speech data) of the topic "Today's Weather" from the script source server 14, and provides speech output of the topic "Today's Weather" via the speech synthesis server 15, if necessary. Speech output of the topic "Today's Weather" may be provided to allow the user to understand the information from factors other than linguistic factors by switching the (voice tone of the) speaker, BGM, and the like in accordance with the content of the weather.

In the playback of the "IT Digital News" segment, the program playback application 21 acquires content data of the topic "Ruling And Opposition Party Leaders To Meet After Cabinet Reshuffle—Chief Cabinet Secretary" and "News Text" from the script source server 14. Then, the program playback application 21 displays the web screen 261 that is the same as the web screen displayed on the script source server 14 which provides the news article when the user accesses the script source server 14, and provides speech output of the news article presented on the web screen 261 by performing speech synthesis processing.

The user can turn on or off the text-to-speech function of the program playback application 21 for reading the content presented on the home screen aloud.

In the playback of the "Music #1" segment, the program playback application 21 plays back the music "Music #1" stored in the local memory of the mobile terminal 11. During the playback of the "Music #1" segment, (a thumbnail image of) the jacket photograph of the music or the like may be displayed.

In the playback of the "CM" segment, the program playback application 21 accesses the media file server 16 to acquire audio data of an advertisement, and plays back the audio data. If the advertisement is a moving image with video, the video is also simultaneously played back. The advertisement to be played back may be determined in advance on the server side, or may differ from user to user in accordance with the preference information of the users or the like registered in the user information management server 12. The preference information of the users may be learned from content such as the content of web pages that have been referred to by the users with interest and music that have been listened to by the users and may be registered.

In the playback of the "ending sequence" segment, the program playback application 21 accesses the media file server 16 to acquire audio data of the "ending sequence" segment, and plays back the audio data.

Additionally, for example, in the playback of the "Today's Schedule" segment using scheduler data in the mobile terminal 11, the program playback application 21 may read the today's schedule aloud by performing speech synthesis processing or display an activation button or the like for activating a calendar application.

Further, for example, in the playback of the "Fortune-Telling Service" segment, the program playback application 21 reads aloud zodiac sign fortune-telling for the user on the basis of the registered profile of the user. Thus, even in the same program, the content to be read aloud in the "Fortune-Telling Service" segment may differ depending on (the zodiac sign of) the user.

Further, for example, in the playback of the "Newly Arrived Email" segment in which newly arrived emails are displayed using data of a mailer in the mobile terminal 11, the program playback application 21 may read a newly arrived email aloud by performing speech synthesis processing, or display an activation button or the like for activating the mailer to create a reply email.

Accordingly, in a program distributed with the program distribution system 1 according to this embodiment, a variety of kinds of information such as news articles collected from predetermined websites, weather forecast, blog articles, twitter feed information, music (server content, local content), schedules, and newly arrived emails may be presented as segments or topics. In the related art, content such as information on web pages is not understood until it is viewed on the screen. In contrast, the program playback application 21 allows such content to be listened to as speech by using the text-to-speech function, and may therefore provide users with new forms of entertainment by using the text-to-speech function.

When reading text information aloud by performing speech synthesis processing, the program playback application 21 may make the tone of speech (speaker's voice) and the like for speech synthesis differ depending on each segment or genre. For example, a news segment may be subjected to speech synthesis processing so that the news segment is presented with a voice of a male of 40s, a weather segment may be subjected to speech synthesis processing so that the weather segment is presented with a voice of a female of 20s, and a sport segment may be subjected to speech synthesis processing so that the sport segment is presented with a voice of a male of 30s. The program playback application 21 may allow the user to set a voice for speech synthesis in units of segments or genres, and may perform speech synthesis processing based on a set parameter. Alternatively, the program playback application 21 or the speech synthesis server 15 may automatically change a voice for speech synthesis in units of segments or genres on the basis of the profile information or preference information of the user.

Since each of the segment display sections 211 on the home screen presents the icon 221 representative of the genre of the segment, the user can easily understand which genre the segment belongs to even if the program is made up of segments including various kinds of information such as news articles, blog articles, music, and schedules.

The icons 221 in the segment display sections 211 may be based on genres, as in the foregoing example, or based on, alternatively or additionally, any other classification method.

For example, segments in a program may be classified into segments including text information to be output via speech through speech synthesis processing and segments including audio data of music to be output via audio by playback, and may be distinguishably identified by the icons 221. Since speech obtained through speech synthesis processing may be artificial (or mechanical), audio data of recordings of speech of text that has been read aloud with a human voice may be prepared in actual use. In this case, whether speech output is based on recordings of human speech or not may be further distinguished by the icons 221.

Furthermore, segments in a program may also be classified into segments subjected to closed processing in the mobile terminal 11 and segments processed using processing by external devices by transmitting the data of the segments to external servers or the like, and may be distinguishably identified by the icons 221.

For example, in a segment, an email stored in the mobile terminal 11 is read aloud through speech synthesis processing. In this case, the email may be subjected to speech synthesis processing by the mobile terminal 11, or may be transmitted to the speech synthesis server 15 and subjected to speech synthesis processing by the speech synthesis server 15. If the content of the email has high confidentiality or high degree of privacy, the content of the email might leak to outside by interception, wiretapping, or the like if the email is transmitted to the speech synthesis server 15. In contrast, such a concern may be prevented or reduced if the email is subjected to speech synthesis processing by the mobile terminal 11. Accordingly, the icons 221 used to distinguishably identify closed processing in the mobile terminal 11 or processing using an external device may be useful for privacy protection or confidentiality protection.

Alternatively, segments in a program may be classified into segments using content data (alone) stored in the local memory of the mobile terminal 11 and segments using content data acquired from external servers, and may be distinguishably identified by the icons 221.

For example, in case where music is played back based on audio data, the music may be played back using audio data stored in the local memory of the mobile terminal 11 or may be played back using streaming data downloaded from the media file server 16. When a user plays back a program and plays back music as a segment in the program while traveling by train or the like, communication may be temporarily disconnected while traveling by train through a tunnel. In such a situation, the playback of the music may not be interrupted if the music uses local data, whereas, the playback of the music may be interrupted if the music uses streaming data. Accordingly, the icons 221 used to distinguishably identify the use of content data stored in the local memory of the mobile terminal 11 or the use of content data obtained from an external server may allow prediction of the risk of playback being interrupted.

As described with reference to the flowchart of FIG. 12, in the program playback process performed by the program playback application 21 of the mobile terminal 11, content data is acquired in units of segments or in units of topics if each segment includes a plurality of topics.

In a situation where communication is temporarily disconnected due to traveling by train through a tunnel, communication traffic, or the like, content data of the next segment (or topic) may not be acquired in time by the start of playback, or playback may be temporarily interrupted during the playback of a segment (or topic). In this case, the program playback application 21 may output a message or screen such as "The communication status is poor and local content will be played back instead" to replace the segment using content data obtained from an external server with a segment using local content data in the mobile terminal 11.

Further, the program playback application 21 has a function for accumulating content data of each of segments constituting a program in the local memory in the mobile terminal 11 while the user is in a network-accessible environment, such as at night during which the user is at home, so that the program can be played back even in a communication environment where it is difficult to access a server. This function allows the user to continuously view the program by using content data of a program stored in the mobile terminal 11 in advance even in a communication environment where it is difficult to access a server.

As described above, content of each of segments or topics constituting a program includes server-generated content generated on the server side (for example, the script analysis server 13), such as news articles on certain websites, and local-generated content generated on the local side, such as today's schedule based on the scheduler in the mobile terminal 11 and music files.

The program playback application 21 may generate one segment or topic by combining server-generated content and local-generated content. In this case, content data held by the user into content data acquired from the server side contains, as program structure information, an instruction for incorporating into the content data.

For example, in the "Today's Weather" segment, reading aloud of the script of "Today's Weather" generated on the server side may be combined with audio data stored in the mobile terminal 11 as BGM to broadcast music of the local data as BGM while the "Today's Weather" is being read aloud. In this case, the content data of "Today's Weather"

acquired from the script analysis server 13 contains, as program structure information, an instruction for "inserting BGM using local data" into the content data.

For example, the "News" segment created on the server side in which news articles on predetermined web pages are displayed contains, as program structure information, an instruction for "inserting BGM with a duration within three minutes using local data" into the "News" segment. In this case, the program playback application 21 searches the local data stored in the mobile terminal 11 for music with a playback duration within three minutes, and audibly outputs the music as BGM while playing back the "News" segment.

The script analysis server 13 may further analyze a news article to be distributed as content data, and transmit the features of music, such as upbeat, happy, and sad, as parameters. When selecting music as BGM, the program playback application 21 may search the local data for music that matches the parameters on the basis of a feature value as a result of analysis of the local music, and audibly output the music. Alternatively, an instruction for inserting music may be made on the server side or the program playback application 21 may automatically select music in accordance with the use environment of the user, such as uptempo music, which may make people happy, as music to be played back in the morning or slow-tempo music, which may calm people's minds, as music to be played back at night before sleep.

Instructions for inserting music into a program may include criteria on which is based to select music from the local data, such as the number of pieces of music, playback duration per piece of music, playback duration of the total pieces of music.

For example, the "Music" segment in which music is broadcast using local data contains, as program structure information, an instruction for "inserting five pieces of music each having a duration of three or more minutes (a duration of 20 minutes) using local data" into the "Music" segment. In this case, the program playback application 21 searches the data stored in the mobile terminal 11 for five pieces of music data each having a playback duration of three or more minutes, arranges the five pieces of music data so that the total playback duration becomes 20 minutes, and audibly outputs the obtained pieces of music data.

If no music data satisfying the specified conditions exists, the program playback application 21 may provide speech output of "we will finish the music segment because of no music."

Second Specific Example of Home Screen

Next, a second specific example of a home screen will be described with reference to FIGS. 19 to 21.

Figure 19:
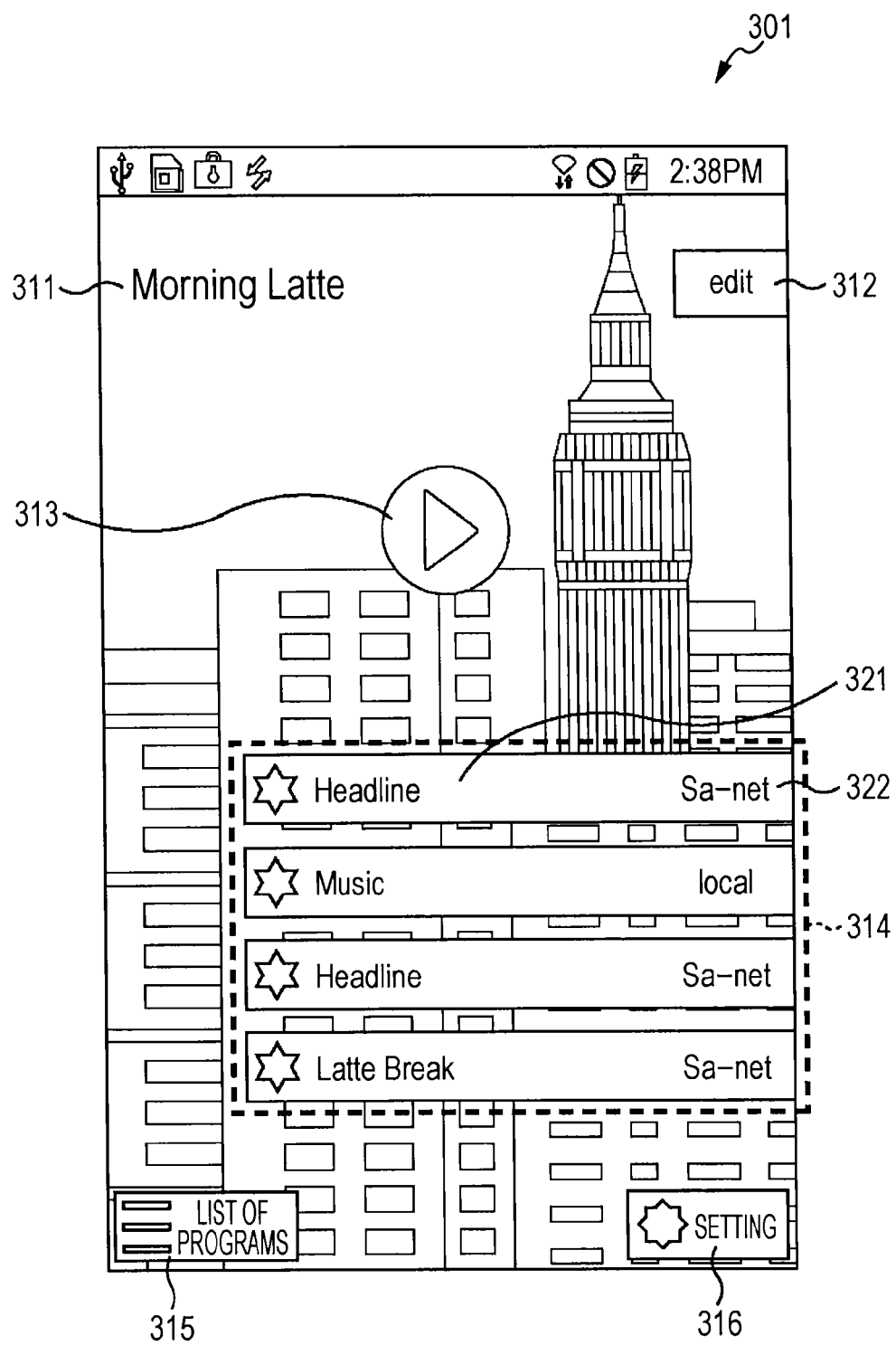
FIG. 19 is a diagram illustrating a second specific example of the home screen.
Figure 20:
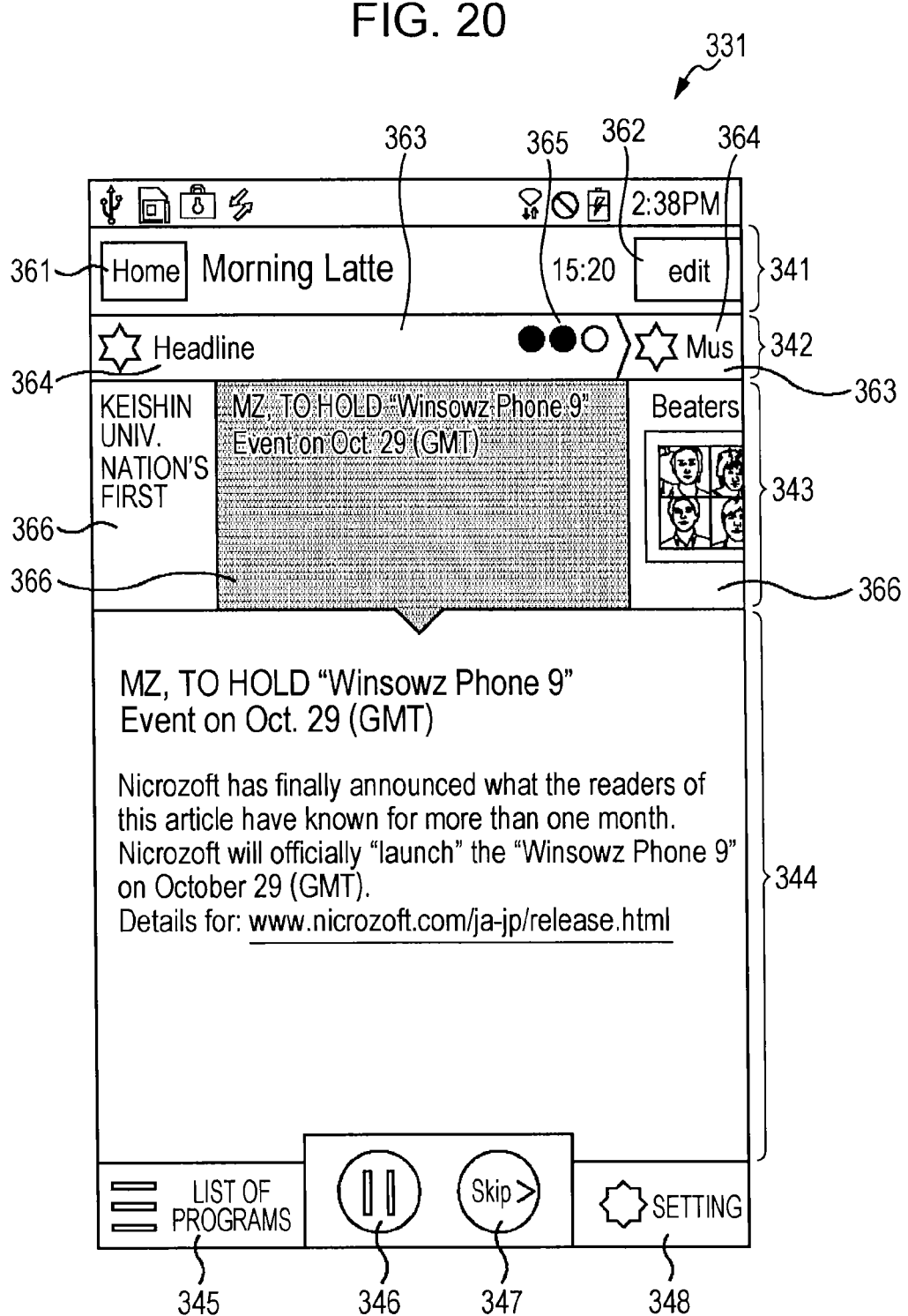
FIG. 20 is a diagram illustrating the second specific example of the home screen.
Figure 21:
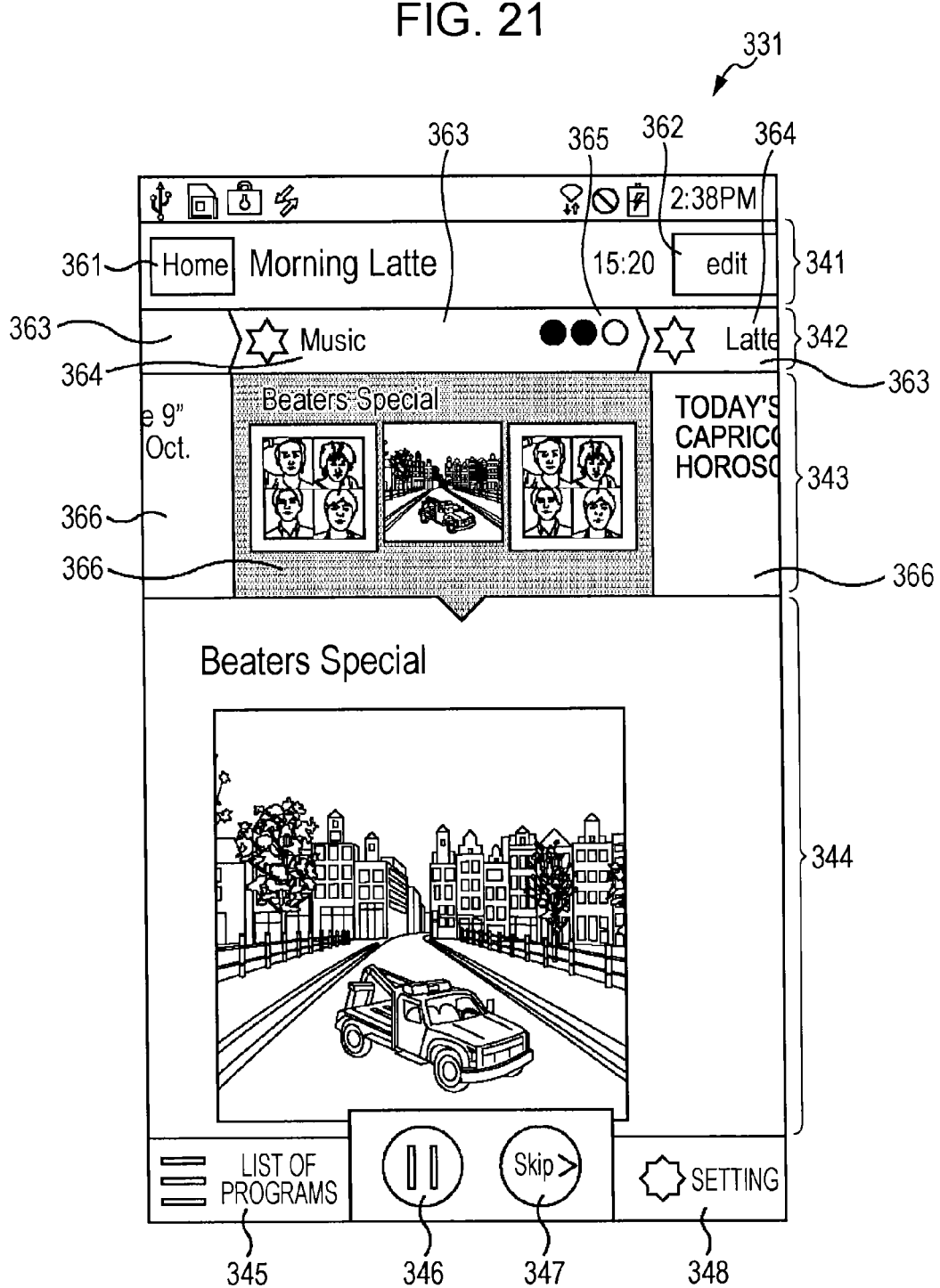
FIG. 21 is a diagram illustrating the second specific example of the home screen.

In the second specific example, a home screen illustrated in FIG. 19 is displayed in an initial state before the playback of a program, and home screens illustrated in FIGS. 20 and 21 are displayed during the playback of the program.

FIG. 19 illustrates an example of a home screen 301 of the program "Morning Latte" in the initial state.

The home screen 301 illustrated in FIG. 19 in the initial state presents a title display section 311 on which the title of the program is displayed, an "Edit" button 312 which allows the screen to transition to the program editing screen 71 (FIG. 5), and a program playback button 313 for starting playback of the program.

The home screen 301 in the initial state further presents a program overview display section 314, a program list jump button 315 for allowing the screen to transition to the program list screen 131 (FIG. 10), and a setting jump button 316 for allowing the screen to transition to the setting screen 151 (FIG. 11). The program overview display section 314 presents titles 321 of segments constituting the program, and sources (or script source) 322 from which the individual segments are provided.

When the user taps on the program playback button 313 on the home screen 301 in the initial state illustrated in FIG. 19, the screen transitions to a home screen 331 illustrated in FIG. 20 or 21 in the playback state.

The home screen 331 in the playback state will be described with reference to FIGS. 20 and 21.

The home screen 331 has a program title bar 341, a segment bar 342, a topic bar 343, and a topic content display section 344.

The program title bar 341 presents a program title and a playback duration. The segment bar 342 provides the display of the entire program in units of segments. The topic bar 343 provides the display of the entire program in units of topics. The topic content display section 344 provides the display of the content of each topic.

The program title bar 341 further presents, in addition to the program title and the playback duration, a home jump button 361 for allowing the screen to transition to the home screen 301 (FIG. 19) in the initial state, and an "Edit" button 362 for allowing the screen to transition to the program editing screen 71 (FIG. 5).

In the segment bar 342, segment blocks 363 corresponding to the plurality of segments constituting the program are sequentially arranged from left to right in the order of being played back, and one of the segment blocks 363 corresponding to the segment currently being played back is displayed on the screen. In FIG. 20, the segment block 363 corresponding to the "Headline" segment is displayed, and, in FIG. 21, the segment block 363 corresponding to the "Music" segment is displayed. When the playback of the "Headline" segment is completed, the segment block 363 corresponding to the "Headline" segment moves to left (outside the screen), and, as illustrated in FIG. 21, the segment block 363 corresponding to the "Music" segment moves to the center of the screen.

Each of the segment blocks 363 in the segment bar 342 presents segment titles 364 such as "Headline" and "Music", and an indicator 365 representing the progress of the segment being played back, such as the position where the topic being currently played back is located in the segment. In the second specific example, each of the segment titles 364 represents the genre (attribute) of the segment.

In the topic bar 343, topic blocks 366 are sequentially arranged from left to right in the order of being played back. Each of the topic blocks 366 is located below the segment block 363 corresponding to the segment to which the topic belongs. The topic blocks 366 present topic titles.

In the topic bar 343, the topic block 366 located in the center of the screen among the plurality of topic blocks 366 arranged in the horizontal direction corresponds to the topic currently being played back. The content of the topic currently being played back is displayed in the topic content display section 344.

In FIG. 20, the news article corresponding to the topic title "MZ, To Hold 'Winsowz Phone 9' Event on October 29 (GMT)" is displayed in the topic content display section 344. In FIG. 21, the jacket photograph of the topic title (music) "Beaters Special" is displayed in the topic content display section 344.

A program list jump button 345, a play/stop button 346, a skip button 347, and a setting screen jump button 348 are arranged below the topic content display section 344. The program list jump button 345 is operated when the user wishes the screen to transition to the program list screen 131 (FIG. 10). The play/stop button 346 is operated to start or stop the playback of a program. The skip button 347 is operated to move the playback target to the next topic or segment. The setting screen jump button 348 is operated when the user wishes cause the screen to transition to the setting screen 151 (FIG. 11).

The user may tap on the skip button 347 on the home screen 331 to perform a forward scan of segments or topics, thereby playing back the desired segment or topic.

The user may also flick (or touch and swipe) the segment bar 342 or the topic bar 343 to the left or right to display the desired one of the segment blocks 363 or the topic blocks 366, and then tap on the topic block 366, thereby playing back (jump and playback) the desired topic.

On the home screen 331 illustrated in FIG. 20, a news article acquired from a website is displayed in the topic content display section 344, and the read-aloud speech of the news article being displayed is also output during the playback of the topic.

In case where content acquired from a website is to be displayed in the topic content display section 344, as illustrated in FIG. 20, the displayed text may include a link to another web page, such as "Details for www.nicrozoft.com/ja-jp/release.html". In this case, alphanumeric characters are read out one by one in the direct reading aloud of the text, and such reading out may not make sense when listening.

Accordingly, the program playback application 21 reads a link portion aloud while replacing the link portion with the title in the header of the link destination. Thus, speech output, for example, "Details for the link destination 'To Launch Winsowz Phone 9'", may be provided, and may make the content of the displayed text and the content at the link destination more understandable.

Alternatively, the program playback application 21 may acquire the web page at the link destination, and display the acquired web page using a sub-screen so as to be superimposed on the home screen. When the user taps on the subscreen, the web browser may be activated to display the web page of the link destination. Alternatively, when the user taps on the sub-screen, the content of the web page at the link destination may be added as the next text-to-speech content (segment), and read aloud after the reading aloud of the news article being displayed in the topic content display section 344 is completed. Alternatively, two additional icons, namely, an icon for activating the web browser and an icon for adding reading aloud, may be displayed near the link portion to allow the user to select the next action.

In this manner, the program playback application 21 may also provide screen display or speech output of information associated with the content (segment or topic) currently being played back.

Further, text of a web page acquired from a website may contain the phrase "page 2" or "next page". In this case, the program playback application 21 may replace the phrase "page 2" or "next page" with the title on the next page or specified page, and read the title aloud.

Furthermore, text of a web page acquired from a website may contain a figure. In this case, the program playback application 21 may insert a caption accompanying the figure and read the caption aloud. For example, in case where a web page contains the text "the Press Conference Held Today (FIG. 1)." and the caption which reads "FIG. 1: Players Laughing with Gold Medals" is placed below FIG. 1 on the web page, the program playback application 21 reads aloud "the Press Conference Held Today. A figure of players laughing with gold medals is shown on the page." This allows the user to understand the content of the figure or photograph in the text on the web page without viewing the web page.

Further, text on a web page acquired from a website may contain a sign indicating the presence of annotation, e.g., "(*1)", and the content of the annotation may be presented in another place on the web page. In this case, the program playback application 21 inserts the content of the annotation at the position of the annotation sign and reads the inserted content aloud when reading the web page aloud.

Such an replaced item may be read aloud only when the user does not display the program playback application 21 in a foreground on the mobile terminal 11 or when the screen display of the mobile terminal 11 is turned off.

On the home screen 331 illustrated in FIG. 21, the jacket photograph (thumbnail image) of music with the title "Beaters Special", which is stored in the local memory of the mobile terminal 11, is displayed in the topic content display section 344. In the playback of the topic, the reading aloud of the title and artist name of the music with the title "Beaters Special" is followed by the (audio) output of the music.

If a long time is involved in the reading aloud of the title and artist name of the music, a certain amount of time is taken until the playback of the music is started, which may impair user experience. Thus, the program playback application 21 determines the text to be read aloud to introduce the music in accordance with a process for determining introductory text on music illustrated in FIG. 22.

Process for Determining Read-Aloud Introductory Text on Music

Figure 22:
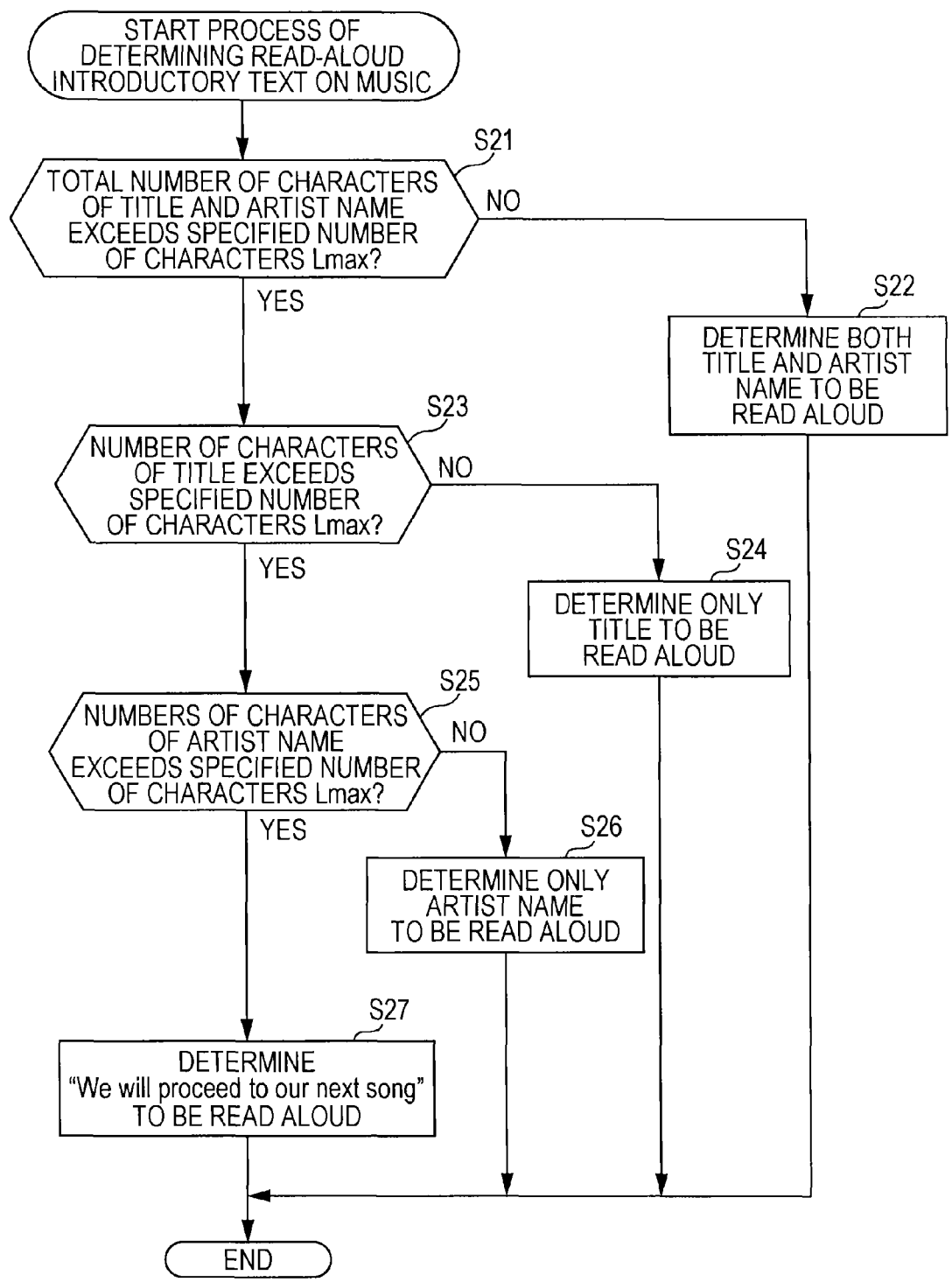
FIG. 22 is a flowchart illustrating a process for determining read-aloud introductory text on music.

FIG. 22 is a flowchart of a process for determining read-aloud introductory text on music.

In step S21, the program playback application 21 determines whether or not the total number of characters of the title and artist name of music to be played back exceeds a predetermined specified number of characters Lmax.

If it is determined in step S21 that the total number of characters of the title and artist name does not exceed the specified number of characters Lmax, the process proceeds to step S22. Then, the program playback application 21 determines both the title and the artist name to be read aloud, and the process ends.

If it is determined in step S21 that the total number of characters of the title and artist name exceeds the specified number of characters Lmax, the process proceeds to step S23. Then, the program playback application 21 determines whether or not the number of characters of the title exceeds the specified number of characters Lmax.

If it is determined in step S23 that the number of characters of the title does not exceed the specified number of characters Lmax, the process proceeds to step S24. Then, the program playback application 21 determines only the title to be read aloud, and the process ends.

If it is determined in step S23 that the number of characters of the title exceeds the specified number of characters Lmax, the process proceeds to step S25. Then, the program playback application 21 determines whether or not the number of characters of the artist name exceeds the specified number of characters Lmax.

If it is determined in step S25 that the number of characters of the artist name does not exceed the specified number of characters Lmax, the process proceeds to step S26. Then, the program playback application 21 determines only the artist name to be read aloud, and the process ends.

If it is determined in step S25 that the number of characters of the artist name exceeds the specified number of characters Lmax, the process proceeds to step S27. Then, the program playback application 21 determines prepared introductory text available for any type of music, such as "We will proceed to our next song", to be read aloud, without using the title or the artist name. Then, the process ends.

The text to be read aloud to introduce music to be played back is determined through the process described above, and is read aloud via speech. Thus, the comfort of viewing and listening to a program will not be impaired even if the number of characters of the title and artist name of music is large and it takes a long time to read aloud the title and the artist name.

In the foregoing description of the program distribution system 1 according to this embodiment, a program may be created by combining a variety of kinds of content information including content stored on the server side and local content, such as news articles collected from predetermined websites, blog articles, twitter feed information, music, schedules, and newly arrived emails, and played back.

Even in a program having the same structure (or a segment or topic having the same structure), content held by users as local data, preference information of users, profile (such as zodiac sign), use environment, and so forth may differ depending on the user who is to play back the program. Thus, the content of the program to be played back may be made different from user to user. Therefore, the program distribution system 1 in this embodiment may allow a user to create a program so that the content of the program (content) dynamically changes, and play back the created program.

Example Configuration of Mobile Terminal

Figure 23:
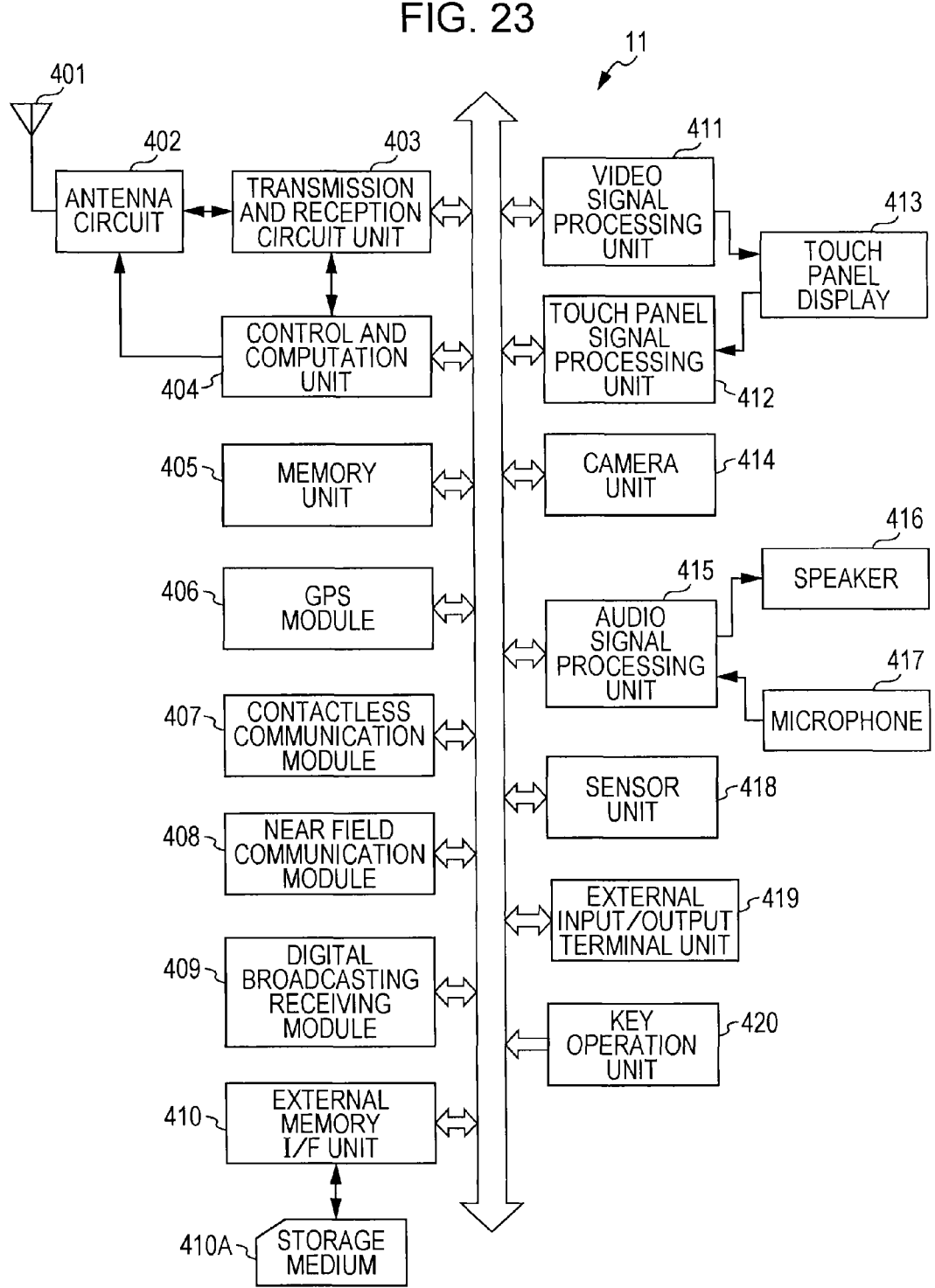
FIG. 23 is a block diagram illustrating a hardware configuration of a mobile terminal.

FIG. 23 is a block diagram illustrating the overall hardware configuration of the mobile terminal 11 on which the program playback application 21 is executed.

In FIG. 23, a communication antenna 401 is, for example, a built-in antenna, and is configured to make calls or transmit and receive emails via a mobile phone network or a public radio communication network, download various application programs, and transmit and receive radio wave signals for communicating with the Internet and the like.

An antenna circuit 402 includes an antenna switching device, a matching circuit, a filter circuit, and so forth. A transmission and reception circuit unit 403 performs processing such as frequency conversion, modulation, and demodulation of transmission and reception signals via a mobile phone network or a public radio communication network.

A speaker 416 is used for, for example, the playback of music, the output of incoming call sound, the output of ringer sound (or ringtone), and the like. A microphone 417 is used to collect sound around from the mobile terminal 11 or collect speech made over the mobile terminal 11, and the like. An audio signal processing unit 415 includes an amplifier circuit for the speaker 416, an amplifier circuit for the microphone 417, an expanding and decoding circuit for expanding and decoding compressed and encoded audio data supplied from a control and computation unit 404, a digital-to-analog conversion circuit for converting an expanded and decoded digital audio data into an analog audio signal, an analog-to-digital conversion circuit for converting an analog audio signal input from the microphone 417 into digital audio data, a compression and encoding circuit for compressing and encoding the digital audio data, and so forth.

A video signal processing unit 411 includes an expanding and decoding circuit for expanding and decoding compressed and encoded video data supplied from the control and computation unit 404, a display panel driving circuit for allowing the expanded and decoded digital video, digital broadcast video received by a digital broadcasting receiving module 409 described below, and the like to be displayed on a touch panel display 413, an so forth.

Further, the video signal processing unit 411 generates display data for displaying a desktop image or various menu images supplied from the control and computation unit 404, a virtual touch area image corresponding to a position on the touch panel display 413, and the like, and allows these images to be displayed on the touch panel display 413.

The touch panel display 413 has a touch sensor unit capable of detecting an input operation performed by a user. A touch panel signal processing unit 412 measures a detected touch position, a touch trajectory, a touch duration, a time interval for touches, and the like on the touch panel display 413, and sends the measured data to the control and computation unit 404 as detected touch data. A user may enter any touch input on the display screen of the touch panel display 413 with the user's finger as well as with any other tool such as a stylus attached to the mobile terminal 11. The touch panel display 413 and the touch panel signal processing unit 412 are configured to support multi-touch gestures.

A key operation unit 420 includes hard keys disposed on the housing of the mobile terminal 11, a peripheral circuit thereof, and so forth. The key operation unit 420 converts the press of a hard key by the user into an electrical signal, amplifies the operation input signal, performs analog-to-digital conversion, and sends operation input data obtained after analog-to-digital conversion to the control and computation unit 404.

An external input/output terminal unit 419 includes a cable connecting connector and an external interface circuit, which are used for data communication via, for example, a cable, a charge terminal and a charge interface circuit thereof, which are used to charge an internal battery via a power cable or the like, and so forth. Various application programs including the program playback application 21 described above may be acquired via the external input/output terminal unit 419.

An external memory interface (I/F) unit 410 includes an external memory slot through which a storage medium such as an external memory is removably inserted, an external memory data communication interface circuit, and so forth. Various application programs including the program playback application 21 may be acquired via a storage medium 410A inserted into the external memory I/F unit 410, such as an external memory.

A near field communication module 408 includes a communication antenna for receiving near field radio waves of wireless LAN, Bluetooth (registered trademark), or the like, and a near field communication circuit. Various application programs including the program playback application 21 may be acquired via the near field communication module 408.

The digital broadcasting receiving module 409 includes an antenna for receiving digital television broadcasts, digital radio broadcasts, and any other desired broadcast, and a tuner. The digital broadcasting receiving module 409 is configured to be capable of receiving a digital broadcast on one channel, and also simultaneously receiving digital broadcasts on multiple channels. The digital broadcasting receiving module 409 is also configured to be capable of receiving data multiplexed on digital broadcasts. The digital broadcast data received by the digital broadcasting receiving module 409 may be processed such as compressed by, for example, the control and computation unit 404 and then stored in (or recorded on) a memory unit 405 or the like.

A camera unit 414 includes an imaging element for capturing a still image or a moving image, an optical system and the like, a peripheral circuit thereof, a circuit for driving a light to emit fill-in light for imaging, and so forth. Still image data or moving image data to be captured by the camera unit 414 is sent to the video signal processing unit 411 as preview video data. Thus, preview video is displayed on the touch panel display 413 when an image is to be captured by the camera unit 414. Further, when still image data or moving image data captured by the camera unit 414 is to be recorded, the captured still image data or moving image data is sent to the control and computation unit 404 and is compressed before it is stored in the memory unit 405 or the storage medium 410A connected to the external memory I/F unit 410.

A contactless communication module 407 performs contactless communication used for, for example, radio frequency-identification (RFID), contactless IC cards, and the like via a contactless communication antenna.

A global positioning system (GPS) module 406 has a GPS antenna, and determines the latitude and longitude of the current position of the mobile terminal 11 using a GPS signal sent from GPS geodetic satellite survey systems. The GPS data (information indicating the latitude and the longitude) obtained from the GPS module 406 is sent to the control and computation unit 404. Thus, the control and computation unit 404 may recognize the current position, movement, and the like of the mobile terminal 11.

A sensor unit 418 includes various detection sensors, such as a terminal state detection sensor for detecting the state of the mobile terminal 11, and peripheral circuits thereof. The sensor unit 418 may include, for example, an inclination sensor, an acceleration sensor, an azimuth sensor, a temperature sensor, a humidity sensor, and an illumination intensity sensor. Detection signals obtained by the sensor unit 418 are sent to the control and computation unit 404. Thus, the control and computation unit 404 may recognize the state of the mobile terminal 11 (such as inclination, acceleration, azimuth, temperature, humidity, and illumination intensity).

The memory unit 405 includes a built-in memory disposed in the mobile terminal 11, a card-type removable memory, and so forth. Examples of the card-type removable memory may include a card that stores the so-called subscriber identity module (SIM) information and the like. The built-in memory includes a read only memory (ROM) and a random access memory (RAM). The ROM stores an operating system (OS), a control program for allowing the control and computation unit 404 to control individual units, various initial setting values, dictionary data, phrase prediction/conversion dictionary data, various kinds of audio data, various application programs including the program playback application 21, and so forth. The ROM includes a NAND-type flash memory or a rewritable ROM such as an electrically erasable programmable read-only memory (EEPROM), and is configured to be capable of storing email data, telephone directory or email address book data, data of still image or moving image content, other various user setting values, and so forth. The RAM serves as a work area or buffer area used when the control and computation unit 404 performs various data processing, and stores data at any suitable time.

The control and computation unit 404 is formed of a central processing unit (CPU), and controls individual units such as the transmission and reception circuit unit 403, the video signal processing unit 411, the audio signal processing unit 415, the GPS module 406, the contactless communication module 407, the near field communication module 408, the digital broadcasting receiving module 409, the external memory I/F unit 410, the camera unit 414, the sensor unit 418, the external input/output terminal unit 419, the key operation unit 420, and the touch panel signal processing unit 412 to perform various computations, if necessary. Further, the control and computation unit 404 executes various application programs stored in the memory unit 405, including the program playback application 21.

Additionally, the mobile terminal 11 includes constituent elements included in a typical mobile terminal, such as a clock unit that measures a time period or a time point, a battery that supplies electric power to individual units, and a power management integrated circuit (IC) that controls the electric power to be supplied.

Example Configuration of Server Device

Figure 24:
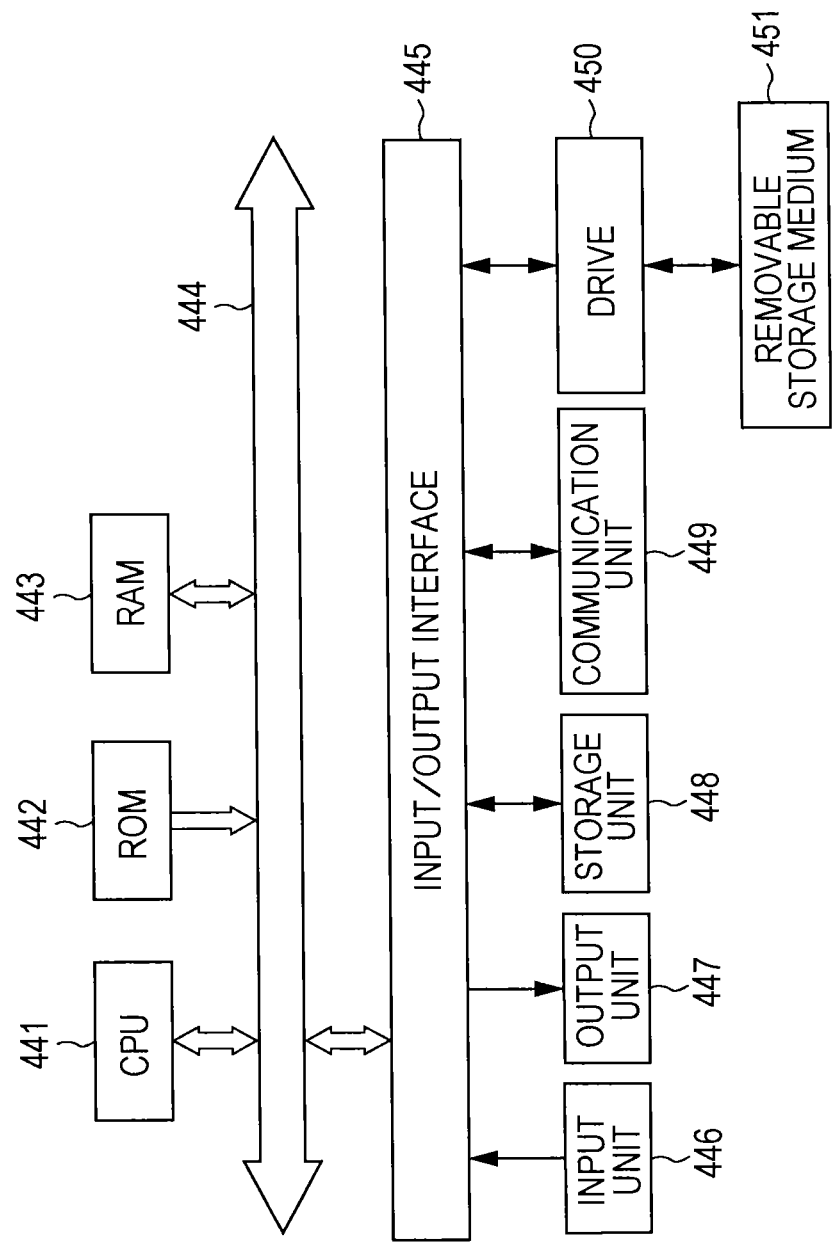
FIG. 24 is a block diagram illustrating a hardware configuration of a server device.

FIG. 24 is a block diagram illustrating an example configuration of hardware of each of the server devices described above, such as the user information management server 12, the script analysis server 13, the speech synthesis server 15, and the media file server 16.

In a server device, a CPU 441, a ROM 442, and a RAM 443 are connected to one another via a bus 444.

An input/output interface 445 is further connected to the bus 444. An input unit 446, an output unit 447, a storage unit 448, a communication unit 449, and a drive 450 are also connected to the input/output interface 445.

The input unit 446 includes a keyboard, a mouse, a microphone, and so forth. The output unit 447 includes a display, a speaker, and so forth. The storage unit 448 includes a hard disk, a non-volatile memory, and so forth. The communication unit 449 includes a network interface and so forth. The drive 450 drives a removable recording medium 451 such as a magnetic disk, an optical disk, a magneto-optical disk, or a semiconductor memory.

In the server device having the configuration described above, the CPU 441 loads, for example, a program stored in the storage unit 448 into the RAM 443 via the input/output interface 445 and the bus 444 and executes the program, thereby performing the series of processes described above.

In the server device, the program may be installed into the storage unit 448 via the input/output interface 445 by placing the removable recording medium 451 in the drive 450. The program may be received by the communication unit 449 via a wired or wireless transmission medium such as a local area network, the Internet, or digital satellite broadcasting, and may be installed into the storage unit 448. The program may also be installed in advance in the ROM 442 or the storage unit 448.

Each of programs and the program playback application 21 to be executed by the CPU 441 of the server device may be a program in which processes are performed in a time-series manner in the order stated herein, or may be a program in which processes are performed in parallel or at necessary timings such as when called.

In this specification, the term "system" refers to a set of constituent elements (apparatuses, modules (components), etc.) regardless of whether all the constituent elements are accommodated in the same housing or not. Thus, a plurality of apparatuses accommodated in separated housings and connected via a network, and a single apparatus including a plurality of modules accommodated in a single housing may be defined as a system.

Embodiments of the present technology are not limited to the foregoing embodiments, and a variety of changes may be made without departing from the scope of the present technology.

For example, all or some of the plurality of embodiments and the functions described above may be used in combination.

For example, an embodiment of the present technology may provide the configuration of cloud computing in which a single function is shared and processed by a plurality of apparatuses in cooperation with one another via a network.

Further, the steps illustrated in the flowcharts described above may be executed by a single apparatus or may be shared and executed by a plurality of apparatuses.

Further, if a single step includes a plurality of processes, the processes included in the single step may be executed by a single apparatus, or may be shared and executed by a plurality of apparatuses.

The embodiments of the present technology may also provide following configurations.

(1) A playback control apparatus comprising:
a playback controller configured to control playback of first content and second content, the first content is to output first sound which is generated based on text information using speech synthesis processing, the second content is to output second sound which is generated not using the speech synthesis processing,
wherein the playback controller causes an attribute of content to be played back to be displayed on the screen, the attribute indicating whether or not the content is to output sound which is generated based on text information using speech synthesis processing.

(2) The playback control apparatus according to (1), wherein the playback controller further causes a display portion, associated with sound output at that time, to be displayed in a highlighted state.

(3) The playback control apparatus according to (1), wherein the playback controller further changes a speaker or background music, which is in part of the sound, in accordance with content of the text information used in generating sound.

(4) The playback control apparatus according to (1), wherein a text-to-speech function for generating sound based on the text information using the speech synthesis processing is configured to be turned on or off, and
the playback controller causes the first content to be read aloud in accordance with a setting to turn on or off the text-to-speech function.

(5) The playback control apparatus according to (1), wherein the portion of the text information of the first content to be read aloud differs from user to user in accordance with preference information or profile of a user.

(6) The playback control apparatus according to (1), wherein the attribute of the content further indicates whether the content is to be read aloud using the speech synthesis processing or is to be output via audio by playing back audio data of music.

(7) The playback control apparatus according to (1), wherein the attribute of the content further indicates whether or not the content is to be subjected to closed processing in the playback control apparatus.

(8) The playback control apparatus according to (1), wherein the attribute of the content further indicates whether or not the content is content that uses only local data in the playback control apparatus.

(9) The playback control apparatus according to (1), wherein the content is content that uses content data in an external server, and the playback controller further performs control to replace the content with content that uses local data in the playback control apparatus.

(10) The playback control apparatus according to (1), wherein the playback controller acquires content data that is data of the content from an external server, and causes the content to be played back by combining the content data acquired from the external server with content data in the playback control apparatus, the acquired content data including, as program structure information, an instruction for incorporating the content data in the playback control apparatus into the acquired content data.

(11) The playback control apparatus according to (1), wherein the text information of the first content includes a link portion, and the playback controller replaces the link portion with a title included in a link destination linked from the link portion, and reads the replaced title aloud.

(12) The playback control apparatus according to (1), wherein the text information of the first content includes a link portion, and the playback controller causes a web page at a link destination identified by the link portion to be displayed on a sub-screen.

(13) The playback control apparatus according to (1), wherein
the content includes a plurality of segments, and
the playback controller causes an attribute of a segment to be played back among the segments of the content to be displayed on the screen.

(14) The playback control apparatus according to (1), wherein
the content includes a plurality of segments, and
when a segment among the segments of the content is to be played back, the playback controller causes an attribute of the segment to be output via audio.

(15) A playback control method comprising:
controlling playback of first content and second content, the first content is to output first sound which is generated based on text information using speech synthesis processing, the second content is to output second sound which is generated not using the speech synthesis processing,
displaying on the screen an attribute of content to be played back, the attribute indicating whether or not the content is to output sound which is generated based on text information using speech synthesis processing.

(16) A playback control apparatus comprising:
controlling playback of first content and second content, the first content is to output first sound which is generated based on text information using speech synthesis processing, the second content is to output second sound which is generated not using the speech synthesis processing,
displaying on the screen an attribute of content to be played back, the attribute indicating whether or not the content is to output sound which is generated based on text information using speech synthesis processing.

What is claimed is:

1. A playback control apparatus comprising:
circuitry configured to control continuous playback of a user-defined program including first, second, and third content, the first content including first sound which is generated based on text information received from a first source using speech synthesis processing, the second content including second sound which is generated based on text information received from a second source different from the first source using the speech synthesis processing, and the third content including third sound which is not generated using the speech synthesis processing,
wherein the circuitry displays an attribute of content to be played back, the attribute indicating whether or not the content includes sound which is generated based on text information using speech synthesis processing.

2. The playback control apparatus according to claim 1, wherein the circuitry further causes a display portion, associated with currently reproduced content, to be displayed in a highlighted state.

3. The playback control apparatus according to claim 1, wherein the circuitry further changes a speaker or background music, which is in part of the sound, in accordance with content of the text information used in generating sound.

4. The playback control apparatus according to claim 1, wherein a text-to-speech function for generating sound based on the text information using the speech synthesis processing is configured to be turned on or off, and the circuitry causes the first content to be read aloud in accordance with a setting to turn on or off the text-to-speech function.

5. The playback control apparatus according to claim 1, wherein the portion of the text information of the first content to be read aloud differs from user to user in accordance with preference information or profile of a user.

6. The playback control apparatus according to claim 1, wherein the attribute of the content further indicates whether the content is to be read aloud using the speech synthesis processing or is to be output via audio by playing back audio data of music.

7. The playback control apparatus according to claim 1, wherein the attribute of the content further indicates whether or not the content is to be subjected to closed processing in the playback control apparatus.

8. The playback control apparatus according to claim 1, wherein the attribute of the content further indicates whether or not the content is content that uses only local data in the playback control apparatus.

9. The playback control apparatus according to claim 1, wherein the content is content that uses content data in an external server, and the circuitry further performs control to replace the content with content that uses local data in the playback control apparatus.

10. The playback control apparatus according to claim 1, wherein the circuitry acquires content data that is data of the content from an external server, and causes the content to be played back by combining the content data acquired from the external server with content data in the playback control apparatus, the acquired content data including, as program structure information, an instruction for incorporating the content data in the playback control apparatus into the acquired content data.

11. The playback control apparatus according to claim 1, wherein the text information of the first content includes a link portion, and the circuitry replaces the link portion with a title included in a link destination linked from the link portion, and reads the replaced title aloud.

12. The playback control apparatus according to claim 1, wherein the text information of the first content includes a link portion, and the circuitry causes a web page at a link destination identified by the link portion to be displayed on a sub-screen.

13. The playback control apparatus according to claim 1, wherein
the content includes a plurality of segments, and
the playback controller causes an attribute of a segment to be played back among the segments of the content to be displayed on the screen.

14. The playback control apparatus according to claim 1, wherein
the content includes a plurality of segments, and
when a segment among the segments of the content is to be played back, the circuitry causes an attribute of the segment to be output via audio.

15. A playback control method comprising:
controlling continuous playback of a user-defined program including first, second, and third content, the first content including first sound which is generated based on text information received from a first source using speech synthesis processing, the second content including second sound which is generated based on text information received from a second source different from the first source using the speech synthesis processing, and the third content including third sound which is not generated using the speech synthesis processing, and
displaying an attribute of content to be played back, the attribute indicating whether or not the content includes sound which is generated based on text information using speech synthesis processing.

16. A non-transitory computer-readable storage medium storing computer-readable instructions thereon, which, when executed by a computer, cause the computer to perform a method comprising:
controlling continuous playback of a user-defined program including first, second, and third content, the first content including first sound which is generated based on text information received from a first source using speech synthesis processing, the second content including second sound which is generated based on text information received from a second source different from the first source using the speech synthesis processing, and the third content including third sound which is not generated using the speech synthesis processing,
displaying an attribute of content to be played back, the attribute indicating whether or not the content includes sound which is generated based on text information using speech synthesis processing.

* * * * *